Oct. 21, 1969 M. O. STEIN 3,474,421

MEMORY CORE TESTING APPARATUS

Filed June 16, 1965 16 Sheets-Sheet 1

INVENTOR.
MORRIS O. STEIN.
BY

Oct. 21, 1969 M. O. STEIN 3,474,421

MEMORY CORE TESTING APPARATUS

Filed June 16, 1965

16 Sheets-Sheet 2

MEMORY CORE TESTING APPARATUS

Filed June 16, 1965 16 Sheets-Sheet 3

MEMORY CORE TESTING APPARATUS

United States Patent Office

3,474,421

Patented Oct. 21, 1969

3,474,421

MEMORY CORE TESTING APPARATUS

Morris O. Stein, Livonia, Mich., assignor to Burroughs Corporation, Detroit, Mich., a corporation of Michigan Filed June 16, 1965, Ser. No. 464,329
Int. Cl. G11c 29/00
U.S. Cl. 340—174 17 Claims

ABSTRACT OF THE DISCLOSURE

The disclosed invention relates to an apparatus for automatically and completely testing a large number of magnetic cores in a stack of memory plane matrices. The testing apparatus utilizes a pulse train generator which produces several predetermined patterns of current pulses. The current pulse patterns are sequentially applied in combination to successive ones of a matrix of bistable magnetic cores, or to successive groups of cores at corresponding addresses in a stack of matrices. The combination of current pulses is selected to subject a core under test to a series of magnetomotive forces which include partial READ, partial WRITE, full READ and full WRITE forces. A bistable resettable device is coupled to a sense line couping cores in each memory plane of a stack of matrices under test so that each core of a group of cores then under test is coupled too a different resettable bistable device. In response to the application of a series of magnetomotive forces to the core under test in a given memory plane a resettable bistable device associated with that plane generates a serial pattern of bi-level voltages. The output of each resettable bistable device is coupled to a comparator which is also connected to a bi-level sample or CHECK voltage pattern source. The comparator produces an output if there is disagreement between the CHECK voltage pattern and any of the outputs of the bistable devices. This output is used to stop the tester at the defective core.

CONTENTS

| | Column |
|---|---|
| A. Introduction | 1 |
| B. Brief Description of the Invention | 2 |
| C. General Description of the Core Tester System | 4 |
| D. Standard Building Blocks Used | 5 |
| (1) AND Gate (FIG. 3) | 5 |
| (2) OR Gate (FIG. 4) | 5 |
| (3) Heavy Buffer and Driver (FIGS. 5 and6) | 6 |
| (4) Inverter (FIG. 7) | 6 |
| (5) Pulse Standardizer (FIG. 8) | 6 |
| (6) Delay Multivibrator (FIG. 9) | 7 |
| (7) Clock Generator (FIG. 10) | 7 |
| (8) Flip Flops (FIGS. 11 and 12) | 8 |
| (9) Memory Register Indicator (FIG. 13) | 9 |
| (10) Binary Counter (FIG. 14) | 10 |
| (11) Memory Drivers (FIG. 15) | 10 |
| E. Magnetic Core Matrix (FIG. 16) | 11 |
| F. Composite Memory Core Current (FIG. 18) | 13 |
| G. Detailed Description of Sub-systems | 13 |
| (1) Pulse Train Generator (FIG. 19) | 13 |
| (2) Current Mixer, Clock, and Timing System (FIGS. 20, 23 and 25) | 15 |
| (3) Stepping Switches (FIG. 21) | 18 |
| (4) Memory Register (FIG. 22) | 20 |
| (5) Comparator (FIG. 22) | 22 |
| (6) ALARM Flip Flop (FIG. 22) | 23 |
| H. System Operation (FIG. 24) | 24 |
| I. Stepping Switch Control Circuit (FIG. 23) | 24 |
| J. Position Indicator Circuit (FIG. 27) | 24 |
| K. Memory Pulse Test Pattern Selector (FIG. 23) | 29 |
| L. Conclusion | 32 |

A. INTRODUCTION

This invention relates to apparatus for testing magnetic cores and more particularly to a testing apparatus for magnetic cores in a memory matrix.

Magnetic core memory matrices may contain thousands of cores. In operation, these cores are subjected to many type of magnetomotive forces, some of them expected and some spurious. Complete testing of a memory core must include the application of many of the expected types of magnetomotive forces to the core and an evaluation of the reaction of the core to the application of such forces. The application of diverse forces to each core and the testing in such manner of all cores in a large memory matrix would be extremely laborious and time consuming. This task is made even more laborious where the cores to be tested are in multi-livel stack of matrices. Further, manual detection of output voltages from the cores will always be subject to error.

It is therefore an object of this invention to provide apparatus for generating a train of current pulses which in combination will subject a core under test to a train of magnetomotive forces.

It is another object of this invention to provide apparatus for generating a train of pulses in response to switching a core under test and for monitoring such a pulse train.

It is another object of this invention to provide a testing apparatus for cores in a memory matrix wherein successive cores in the matrix are automatically tested in succession until a defective core is found.

It is a further object of this invention to provide apparatus for rapid and complete testing of cores in a multi-level stack of matrices.

It is still another object of this invention to provide a testing apparatus for cores in a memory matrix which will leave successive cores subjected to test in opposite states of magnetization.

It is still a further object of this invention to provide a comparator for detecting an abnormalcy in any one of several simultaneously tested cores.

B. BRIEF DESCRIPTION OF THE INVENTION

The above and other objects are achieved by an automatic testing device wherein a pulse train generator produces several predetermined patterns of current pulses. The current pulse patterns are sequentially applied in combination to successive ones of a matrix of bistable magnetic cores, or to successive groups of cores at corresponding addresses in a stack of matrices. The combination of current pulses is selected to subject a core under test to a series of magnetomotive forces which include partial READ, partial WRITE, full READ, and full WRITE forces. A bistable resettable device is coupled to the sense line coupling cores in the different memory planes of a stack of matrices under test so that each core of a group of cores under test at the same time is coupled to a different resettable bistable device. In response to the application of a series of magnetomotive forces to a core under test in a given memory plane the resettable bistable device associated with that plane generates a serial pattern of bi-level voltages. The output of each resettable bistable device is coupled to a comparator which is also connected to a bi-level sample or CHECK voltage pattern source. The comparator produces an output if there is disagreement between the CHECK voltage pattern and any of the outputs of the bistable devices.

The system also includes a control circuit for leaving alternate cores in opposite states of magnetization after they have been tested, if desired. The control circuitry for accomplishing this purpose utilizes a conditionally enabled gate in the pulse generating portion of the system which is operative to terminate the magnetomotive force pulse train applied to a core under test and includes a bistable device coupled to this gating means. The bistable device enables the gating means in one of its stable states and is automatically set into its other stable state in synchronism with each stepping of a stepping switch. The control system also utilizes certain portions of the LOGIC system of the pulse generator and through connections to these portions of the logic system the control circuitry is adapted to be responsive either to a READ pulse or a WRITE pulse for setting the bistable circuit into that state in which it does not enable the conditionally enabled gate. By selectively disabling the pulse generator so as to terminate the test pulse trains applied to successive cores in a READ and WRITE pulse alternately, successive cores are left in opposite states of magnetization after testing.

Finally the system includes a novel comparator for detecting a disparity between a CHECK pulse pattern and any one of several bi-level voltage patterns. The comparator includes two multi-input gates, one of them an AND gate and the other an OR gate, each for receiving all of the voltage patterns. The comprator also includes two additional coincidence circuits whose outputs are coupled to a common point through a mixer circuit. One coincidence circuit receives the output of the OR gate and at its other input the inverted CHECK pulse train. The other coincidence circuit receives at its inputs the inverted output of the AND gate and the CHECK pulse train. A signal is produced at the common output point if any one of the voltage patterns differs from the CHECK pulse train.

While some of the objects and a brief description of the invention have been given above, the invention and its objects will be best understood by referring to the following detailed description and to the accompanying drawings wherein FIG. 1 is a block diagram of a system incorporating the subject invention;

FIG. 2 is a drawing layout illustrating the manner in which

FIG. 16 is a schematic diagram of a typical matrix of cores to be tested;

FIG. 19 is a circuit diagram of a pulse train generator including a binary counter and a logic gate system;

FIG. 19(*a*) is a circuit diagram of an optional addition to the logic circuit of FIG. 19;

FIG. 20 is a diagram of the core drive and inhibit current mixing circuit of the system;

FIG. 21 is a circuit diagram of a typical stepping switch usable in the system;

FIG. 22 is a diagram of the memory register, comparator and ALARM circuit portion of the system;

FIG. 22(*a*) is a diagram of a slight modification of the comparator in FIG. 22;

FIG. 23 is a diagram of the clock, timing and pulse train selection control portion of the system;

Figure 1:
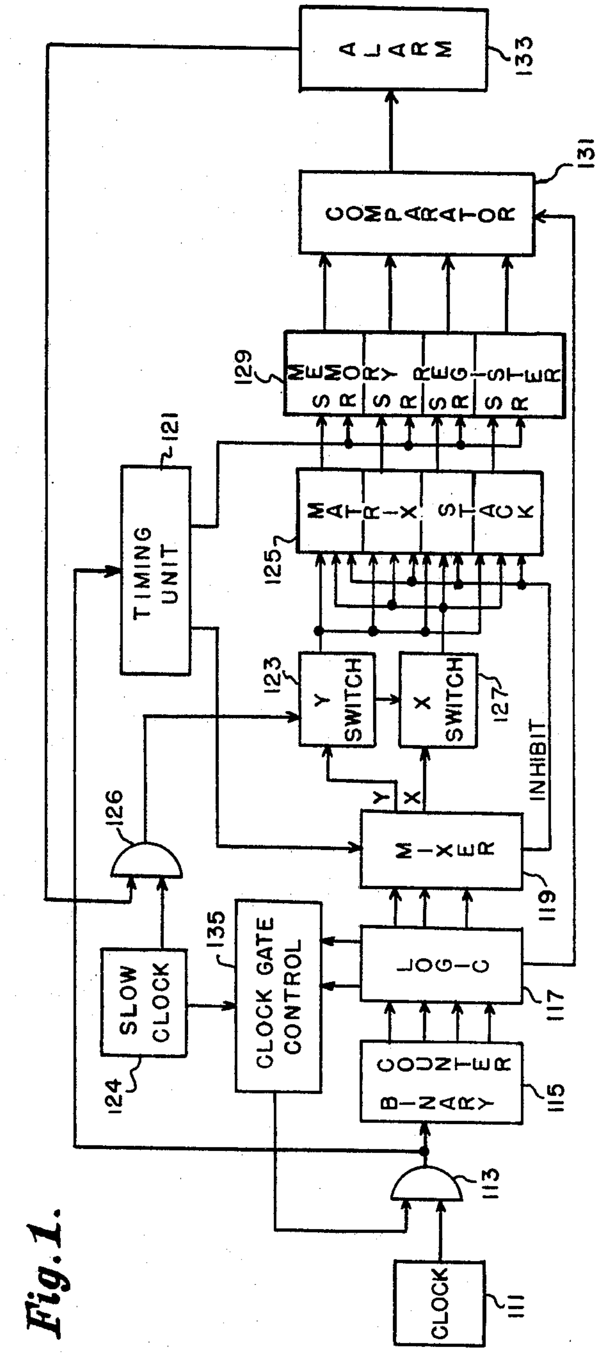

In each drawing the number of the drawing is incorporated as the first part of the number of each element in the drawing so that upon reading the specification it may be ascertained quickly in which drawing a given element appears.

C. GENERAL DESCRIPTION OF THE CORE TESTER SYSTEM

FIG. 1 is a block diagram of a core tester incorporating some of the features of my invention. Clock 111 generates a train of clock pulses fed through clock gate 113 to the input of binary counter 115. Binary counter 115 generates a plurality of pulse trains at its several outputs in response to the clock pulses. Logic system 117, consisting of AND gates and OR gates, receives the outputs of binary counter 115 and combines them into several clock pulse trains fed into mixer 119. Mixer 119 further combines the logic pulse outputs of logic system 117 with timing pulses received from timing unit 121 which generates a series of timing pulses in response to each clock pulse fed through clock gate 113. One timed output of mixer 119 is fed through Y stepping switch 123 to the Y drive lines of four memory planes 125 under test. A second timed output of mixer 119 is applied through X stepping switch 127 to the X drive lines of the memory planes under test. The third output of mixer 119 is applied to the inhibit lines of the core planes under test.

The gating elements of logic system 117 are so arranged that in combination, currents in the X, Y, and INHIBIT lines subject a core under test to a train of magnetomotive forces which include partial and full READ and WRITE forces. The X and Y switches are connected to the X and Y drive lines of the matrices under test so that upon successive steppings of the switches successive cores are subjected to the train of magnetomotive forces. The Y stepping switch is stepped in response to pulses from slow clock 124, gated through AND gate 126. The X stepping switch is advanced after a predetermined number of steps by the Y stepping switch.

Usually with most clock pulses generated by the clock 111, a magnetomotive force will be applied during a portion of the clock period to the core under test. This force may be sufficient to switch the core or it may be designed to be less than enough for the purpose. Typically the test currents will be applied to cores having the same X–Y address in the four planes 125 under test.

The reaction of each such core is stored by an individual flip-flop of memory register 129. The flip flops of the memory register are reset during an early portion of each clock period by a timing pulse from timing unit 121. The set terminal of each flip flop is connected to the sense line of one of the core planes under test. The reaction of a core under test may or may not be sufficient to set the corresponding flip flop. With the application of a succession of pulses to the core under test the outputs of the memory register flip flops will constitute a predetermined pattern for a normal core.

The output of each flip flop of memory register 129 is connected to one input of comparator 131. Comparator 131 is also connected to LOGIC system 117 from which it receives a CHECK pulse train whose configuration matches the output expected from each memory register flip flop when the core is interrogated by a normal pulse train such as 1811 of FIG. 18. Comparator 131 is operative to produce an output in the event that there is disagreement between the check pulse train and any one of the outputs received from memory register 129. The output of comparator 131 is fed to an ALARM circuit 133. The output of ALARM circuit 133 is connected to an input of AND gate 126, and is operative in response to an ALARM indication from comparator 131 to cause the stepping switches 127 and 123 to stop.

An additional feature of the automatic core tester is a sub-system for causing alternate cores of a plane under test to be left in opposite states of magnetization after testing. This is accomplished by CLOCK gate control 135. Clock gate control 135 is shown as having three inputs, receives an output from the SLOW clock 124 and two gating outputs from LOGIC system 117, and produces an output which normally enables clock gate 113 to transmit clock pulses from 111. One gating output from the LOGIC system 117 is energized in synchronism with the application of a READ pulse to a core under test. The other gating output from the logic system is energized in synchronism with the application of a WRITE pulse to the core under test. The clock gate control is operative to commence its clock gate-enabling output in synchronism with the stepping of Y switch 123. Consequently a new series of pulse trains is generated with each stepping of the Y switch 123.

The clock gate control 135 is also operative to discontinue its clock gate-enabling output a predetermined time after each stepping of switch 123 by slow clock 124 in response to alternate ones of the gating outputs of LOGIC system 117. Consequently the last pulse train applied to successive cores terminates alternately in READ and WRITE pulses, so as to leave successive cores in opposite states of magnetization.

D. STANDARD BUILDING BLOCKS USED

The circuits to be described in connection with FIGS. 3 through 15 are merely exemplary. Other circuits are available and known to those skilled in the electronics arts for performing the various functions performed by the circuits illustrated in and described relative to these figures. Reference should be made to Digital Computer Principles by the Burroughs Corporation, published by the McGraw-Hill Book Company for other circuits which may be used in place of those described herein.

The basic AND gate, OR gate, Heavy Buffer, Driver, Inverter, Pulse Standardizer, Delay Multivibrator and Flip Flop, constitute fundamental building blocks which are employed in different combinations in the system to compose various logic and control sections thereof. Positive diode logic is employed, in which 0 volt or ground level is the "high," or permissive, signal and −4 volts is the "low," or inhibitive signal, the circuits being designed, however, to recognize any signal between −1 volt and +1 volt as a high signal and any signal between −3 and −5 volts as a low signal.

Figure 3:
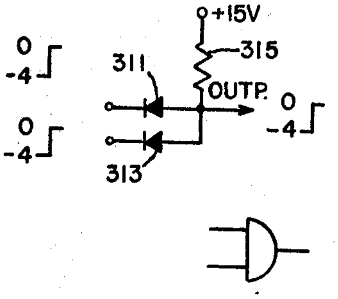
FIG. 3 is a circuit diagram of a typical AND gate.

(1) AND Gate (FIG. 3)

The logical symbol and electrical circuit for a two-input, diode, positive AND gate are shown in FIG. 3, the circuit comprising the input diodes 311 and 313 whose anodes are connected to a +15 volt source through resistor 315. If either or both of the input signals are low, −4.0 volts, the output signal will be at the low level. With both gate inputs at the high or 0 volt level, the output will be correspondingly high.

Figure 4:
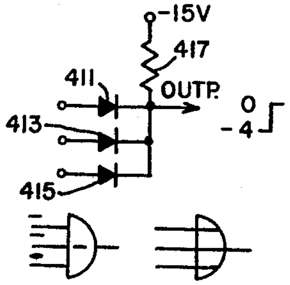
FIG. 4 is a circuit diagram of a typical OR gate.

(2) OR Gate (FIG. 4)

The logical symbol and electrical circuit for a three-input positive OR gate are shown in FIG. 4, comprising the three-input diodes 411, 413 and 415 connected at their cathodes to a −15 volt source through resistor 417. With all the inputs at the low level, −4.0 volts, the output voltage will be at the low voltage level. When one or more of the inputs are at the high level, the output voltage will be high.

The positive OR gate can be employed as a negative AND gate, which permits a low signal to appear at its output when a low signal is applied simultaneously to all of its inputs. Such a gate is shown symbolically in the lower left hand corner of FIG. 4.

Figure 5:
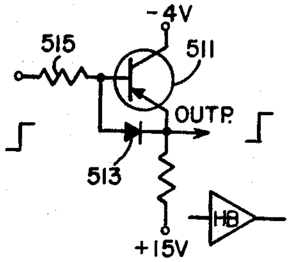
FIG. 5 is a circuit diagram of a typical heavy buffer unit.
Figure 6:
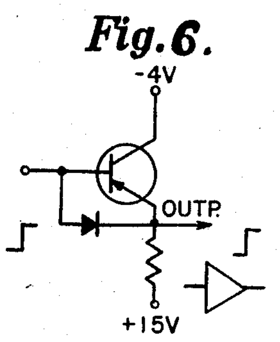
FIG. 6 is a circuit diagram of a typical light buffer unit.

(3) Heavy Buffer and Driver (FIGS. 5 and 6)

The output of a logic gate may be coupled to an emitter-follower transistor circuit that accomplishes an increase in drive current without inversion of the input signal. One form of this circuit is the Heavy Buffer Circuit shown in FIG. 5. The output will be high when the input is high, and low when the input is low. The transistor 511 conducts at all times, because a high input does not reverse bias the base-emitter junction. The diode 513 connected between the base and emitter discharges any stray capacity at the output when the input signal switches from −4 volts to ground, while the input resistor 515 has a low ohmic value and serves as an oscillation suppressor. Where the high output capabilities of the Heavy Buffer of FIG. 5 are not required, a simple driver, comprising an emitter follower transistor stage may be used. Such a circuit and its symbol are shown in FIG. 6.

Figure 7:
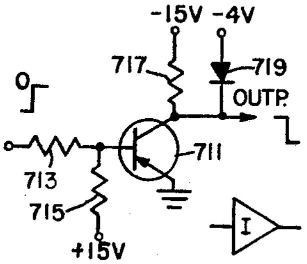
FIG. 7 is a circuit diagram of a typical inverter.

(4) Inverter (FIG. 7)

The logic symbol and electrical circuit for an inverter are shown in FIG. 7 in which the transistor 711 is connected in a grounded-emitter configuration and serves to provide at its output a logical inversion of a signal at its input. Additionally, it provides isolation between groups of logical stages to prevent oscillation. The inverter also re-establishes the signal level of 0 v. and −4 v. Diode AND gates and OR gates tend to attenuate the upper and lower signal levels, since they are passive elements. A low level input signal causes current to flow through resistor 713 from the +15 volt base biasing resistor 715, rendering the base of the transistor slightly negative. The transistor conducts in saturation through the −15 volt collector resistor 717, placing the output signal, taken from the collector, at ground level. When the input signal is high, the base will be slightly positive with respect to the emitter, and the transistor 711 will be cut off, with its output being kept at a low level approximately −4 volts by the action of the diode clamp 719 on its collector output.

Figure 8:
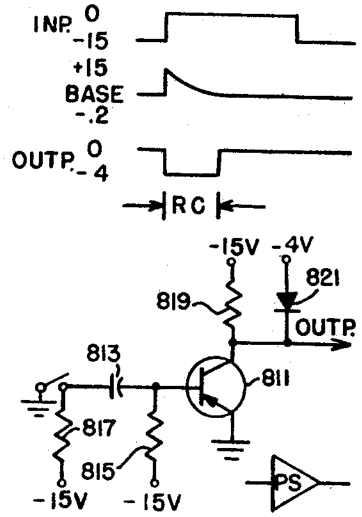
FIG. 8 is a circuit diagram of a typical pulse standardizer.

(5) Pulse Standardizer (FIG. 8)

The logic symbol, circuit diagram and wave forms for a typical pulse standardizer are shown in FIG. 8. The function of the pulse standardizer is to generate a short pulse having a predetermined duration not exceeding that of the input pulse. Its principal component is a transistor 811 connected in a grounded emitter configuration. The base input circuit includes a capacitor 813, resistor 815, which is connected to a −15 volt biasing source, and resistor 817, connected to a −15 volt source. The output circuit includes the collector load resistor 819 and output clamp diode 821 connected to negative voltage sources of −15 volts and −4 volts, respectively. Under static conditions, the input is low, −15 volts, and the transistor conducts in saturation due to resistor 815 which is connected to −15 volts and which forward biases the base-emitter junction. Thus, the base is clamped near ground by the collector-emitter junction, and the capacitor 813 is charged to approximately 15 volts from ground, through the emitter base junction, resistor 817 to the −15 volt source. With the transistor conducting, the collector output is at ground or slightly negative, and the diode 821 is reverse biased. When the input signal switches from −15 volts to ground the positive going voltage signal is coupled through the capacitor 813 to the base of the transistor, turning it off. With the transistor cut off, the diode 821 clamps the output to approximately −4 volts.

The transistor remains cut off until the capacitor discharges to a point where the base-emitter junction becomes forward biased and the transistor conducts, the capacitor discharge path being from −15 volts through resistor 815 and the capacitor to the grounded input. Thus, it is primarily the time constant of capacitor 813 and resistor 815 which determines the cut-off time for the transistor and the time duration or length of the output signal.

Figure 9:
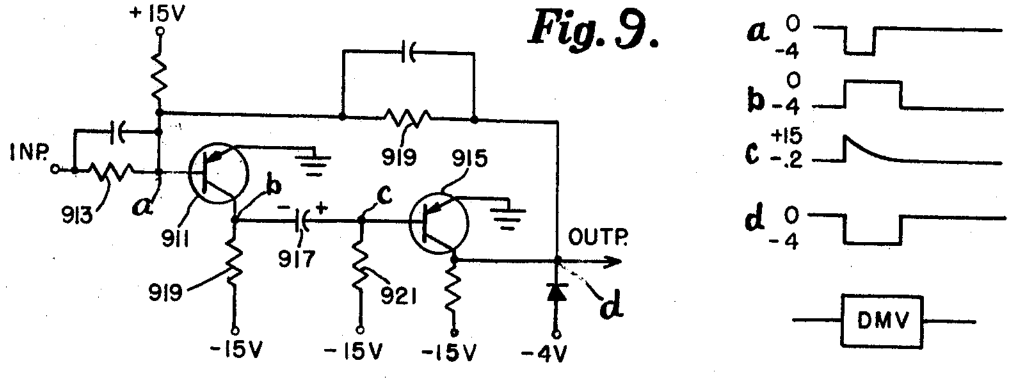
FIG. 9 is a circuit diagram of a typical delay multivibrator.

(6) Delay Multivibrator (FIG. 9)

FIG. 9 shows the logic symbol and circuit schematic of another basic circuit element, employed as a Delay Multivibrator or DMV. The function of the DMV is to generate a long pulse of predetermined duration in response to a short pulse. The DMV comprises essentially an Inverter feeding a Pulse Standardizer which has a feed-back path from its output to the input of the Inverter. Initially, transistor 911 is off, input resistor 913 being held at or near ground, and transistor 915 conducts. The application of a negative triggering pulse or voltage to the base of transistor 911 causes it to conduct and its collector to rise to approximately ground level, thereby coupling a positive going voltage shift to the base of transistor 915 through charged capacitor 917 to turn transistor 915 off.

With transistor 915 cut off, its collector potential goes negative and is applied to the base of transistor 911 as a negative voltage through resistor 919 to maintain transistor 911 conducting notwithstanding the expiration of the triggering pulse. With transistor 915 cut off, capacitor 917, which has been previously charged through resistor 919, discharges through resistor 921, lowering the potential at the base of transistor 915 to the point where it is again forward biased and turned on. As transistor 915 turns on, its collector voltage goes to approximately ground level, thus providing a controlled output pulse from its collector of a duration primarily determined by the RC time constant of resistor 921 and capacitor 917. With the return of the output of transistor 915 to ground level, the base of transistor 911 becomes positive, and 911 ceases to conduct, restoring the DMV to its static state. The waveforms at several points in the DMV appear at the upper right of FIG. 9.

Figure 10:
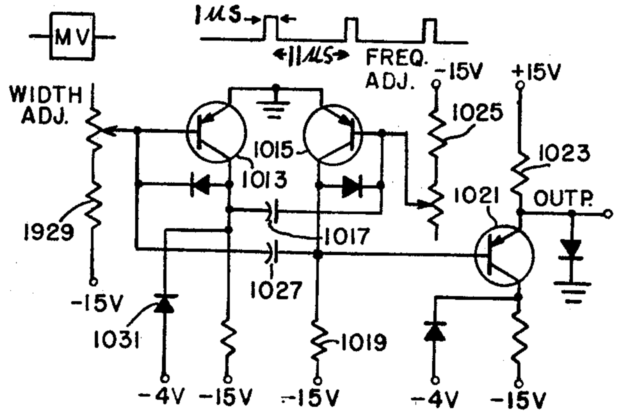
FIG. 10 is a circuit diagram of a typical free running multi-vibrator.

(7) Clock Generator (FIG. 10)

The Clock generator 1011 is a free running oscillator or as table multivibrator formed of two pulse standardizer stages connected so that the output of one feeds the input of the other. When the indicated operating voltages are applied to the Clock generator, one transistor will usually conduct more than the other due to variations of the tolerances of the electrical components, resulting in a switching action where one transistor is on and will cause the other transistor to cut off for a period determined by the capacitor and resistor in the input circuit of the off transistor.

Assuming transistor 1013 begins conducting more than 1015, as the collector of transistor 1013 becomes less negative, thereby coupling a positive going signal through capacitor 1017 to the base of transistor 1015, the latter is pulled to cut off, lowering its collector potential to about −4 volts due to current flow through its load resistor 1019 and through the base-emitter junction of transistor emitter-follower output stage 1021, which is conducting, and through resistor 1023 to +15 v.

Transistor 1015 will remain cut off by the positive voltage change applied thereto from transistor 1013 until capacitor 1017 has discharged through the frequency adjustment control resistance newtork 1025 to −15 volts to ground, then through the emitter-collector junction of transistor 1013 to initiate conduction of transistor 1015. When properly adjusted, the output signal taken from the collector of transistor 1015 will be at or near ground for 1 μs. and negative for 11 μsecs. An output buffer, principally comprising eimtter-follower connected transistor 1021, is usually provided. A typical wave-shape appears at the top of FIG. 10.

As transistor 1015 begins to conduct, thus elevating its collector potential to ground, a positive voltage change is coupled through capacitor 1027, causing transistor 1013 to cut off. Transistor 1013 remains cut off for 0.75 to 1.4 μsec., depending on the setting of the width adjustment control resistance network 1029 through which capacitor 1027 discharges to the point where the base-emitter of transistor 1013 is again forward biased. The diode 1031 clamps the collector of transistor 1013 at −4 volts during the time it is cut off.

Figure 11:
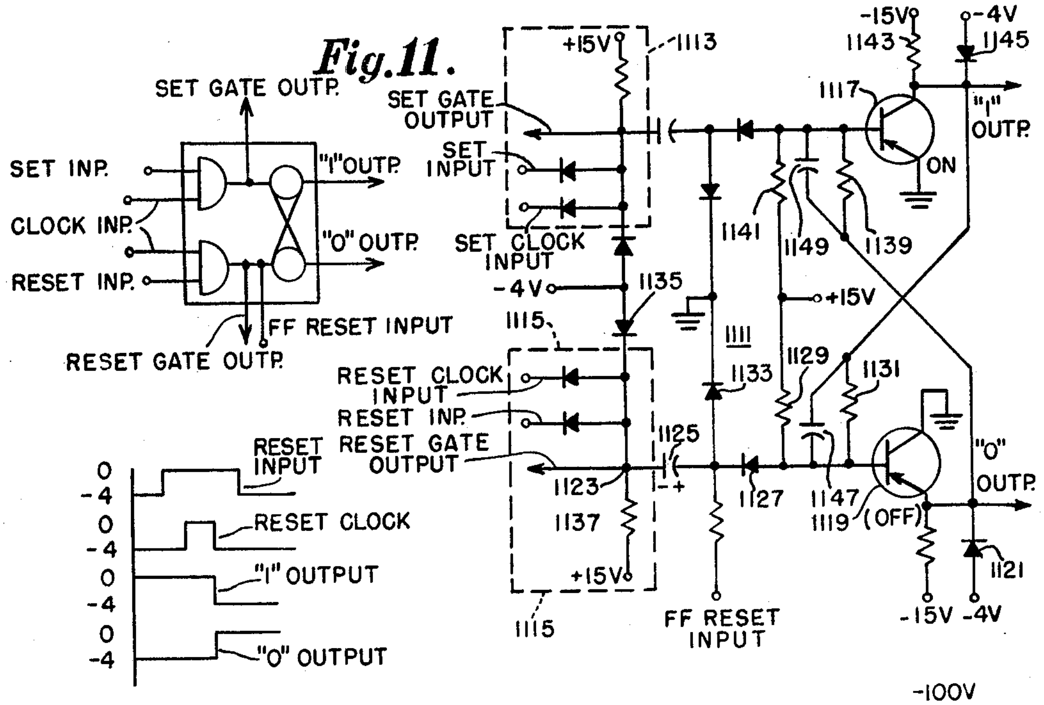
FIG. 11 is a circuit diagram of a trailing edge triggered flip-flop.
Figures 12, 13:
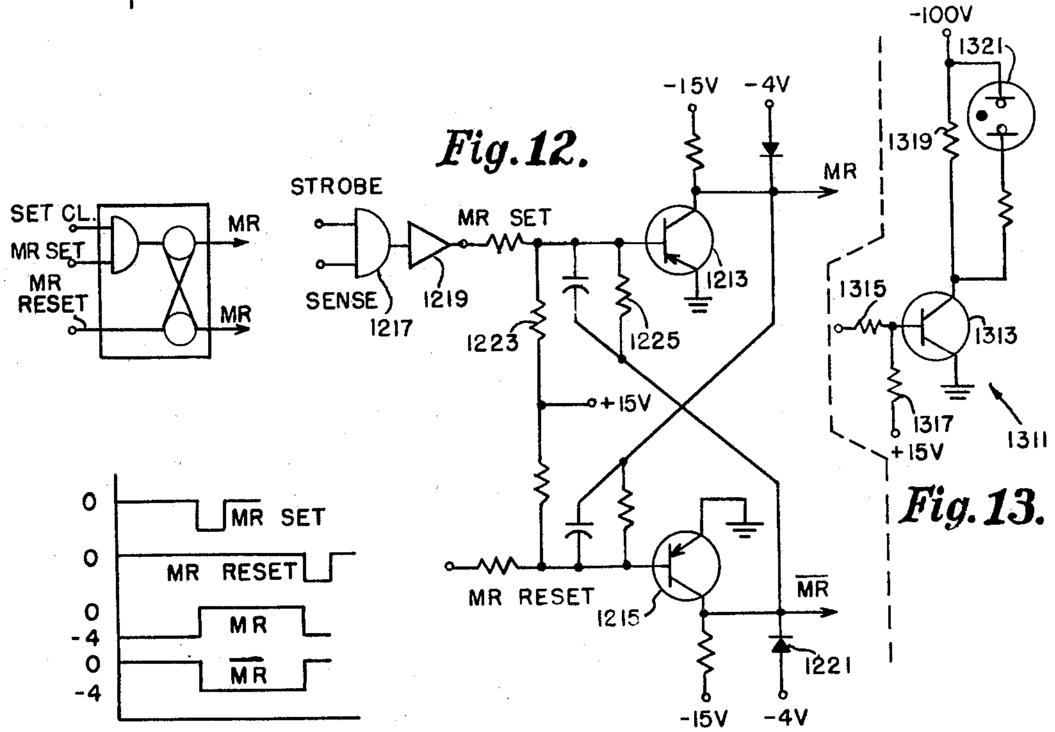
FIG. 12 is a circuit diagram of a typical leading edge triggered flip-flop.
FIG. 13 is a circuit diagram of a typical indicator.

(8) Flip Flops (FIGS. 11 and 12)

Two types of flip-flops are employed in the system. One is designed for triggering by the trailing edge of a positive pulse, and the other is designed for triggering at a given D.C. voltage level. The majority of the flip-flops are of the first type and comprise essentially a pair of cross-coupled inverter stages and a pair of AND gates whose respective output are connected to the respective inputs of the inverters through respective capacitance triggering networks. The basic flip-flop 1111 is shown in FIG. 11 as having three inputs of which the Set and Reset Inputs are gated with Clock pulses through AND gates and the third input, labeled FF Reset Input, is a direct means of resetting the flip-flop without going through logic. The outputs from the Set and Reset stages of the flip-flop are labeled "1" and "0"—the "1" output is high and "0" output is low when the flip-flop is Set. The "1" output is low and the "0" output is high when the flip-flop is Reset. The flip-flop is triggered from one state to its opposite state by a negative voltage swing at the output of the AND gate 1113 or 1115 in is Set or Reset Input, respectively.

Under static conditions, assuming the FF is Set, transistor 1117 will be conducting, supplying a high voltage level from its "1" output and transistor 1119 will be off, supplying a low voltage level from its "0" output.

When the signal at the reset input terminal goes from −4 volts to ground and a clock pulse going from −4 volts to ground is applied to the reset clock input terminal, the reset gate output 1123 goes high, from −4 volts to ground, and is coupled as a positive going signal through capacitor 1125 to the anode of diode 1133 and to the cathode of the diode 1127, whose anode is connected to the base of the non-conducting transistor 1119. The base of transistor 1119 is connected to the junction of voltage divider 1129 and 1131, connected between +15 volts and the collector of transistor 1117 and cannot go more than 0.2 to 0.4 volt positive due to the clamping action of diodes 1133 and 1127. Diode 1127 is thus reverse biased and disconnects the positive input pulse from the base of transistor 1119. Capacitor 1125 has been previously charged to −4 volts from the output of the reset gate, which cannot go below −4 volts due to the clamping action of gate clamp diode 1135, and discharges through diode 1133.

As the gated clock pulse ends, the reset gate output goes from ground to −4 volts and is coupled as a negative going signal through the capacitor 1125 and diode 1127 to the base of transistor 1119 to initiate conduction thereof. The negative going signal forward biases diode 1127 and reverse biases diode 1133, and capacitor 1125 charges to −4 volts through the transistor 1119. The collector of transistor 1119 goes to ground, making the "0" output high and, due to current flow through voltage divider composed of the resistors 1139 and 1141, the base of transistor 1117 will go positive, rendering it non-conductive. As transistor 1117 is cut off, its collector goes to −4 volts due to current flow through resistor 1143 and output clamp diode 1145. These voltage changes and their time relationship to the reset input pulse are shown in the diagram in the lower left of FIG. 11. The cross-over or coupling resistors 1131 and 1139 are by-passed with capacitors 1147 and 1149 which immediately couple voltage changes at the collector of one stage to the base of the other to speed up the switching time, which for the basic flop-flop is 1.1 μsec. maximum for a complete reversal of states.

The direct reset input terminal, labelled FF RESET INPUT, to the flip-flop by-passes the triggering capacitor network and will reset the flip-flop on the leading edge of a negative going signal that remains at the lower level for at least 1 micro-second.

The set gate output terminal and the reset gate output terminal serve a dual purpose. First, where the flip-flop is used as part of a binary counter, the reset gate ouptut is utilized to couple the output of the reset gate to the input of the next higher stage. Secondly, the gate output terminals provide a means for suppressing the output of the respective gates, so as to prevent setting or resetting the flip-flop. Thus, by applying a −4 volt bias to the set gate output terminal, setting of the flip-flop may be effectively prevented. Similarly, resetting of the flip-flop may be prevented by applying −4 volts to its reset gate output terminal.

Due to the symmetry of the Set and Reset stages of the flip-flop 1111, the above description, involving the resetting of an initially Set flip-flop applies equally well to the setting of an initially Reset flip-flop. Of course, the functions of corresponding parts lying on opposite sides of the axis of symmetry of the circuit are interchanged.

The other form of flip-flop employed herein is the memory register flip-flop or MRFF shown in FIG. 12, comprising essentially a pair of cross-coupled inverter stages, with triggering at a given signal level. The MRFF is used for storing a pulse fed to it from a switched core through the sense amplifier. Since the MRFF is a negative trigger flip-flop and is triggered by a negative pulse, it triggers on the leading edge of the pulse. Starting with the flip-flop in the reset state, transistor 1213 is non-conducting and supplies a low level output signal from its collector, clamped at −4 volts, at the output terminal labeled MR. The Set Input terminal of the flip-flop is supplied from a two input negative AND gate 1217 or strobe gate, the Strobe Input terminal of which is normally high or at 0 volts, maintaining the base of transistor 1215 positive so it will not conduct even when a signal is applied at its Sense Input terminal.

The flip-flop is transferred to its Set state by applying a negative going strobe pulse and sense pulse from the sense amplifier (not shown) to the strobe gate 1217 to lower the potential level of its Set Input terminal. The negative output of the gate 1217 is transferred through the driver 1219 to make the base of transistor 1213 negative, setting it into conduction, whereupon its collector goes to ground and places the MR output terminal at a high level and a positive potential on the base of transistor 1215 which turns off. Turning off transistor 1215 allows its collector to go from 0 to −4 volts where it is clamped by diode 1221 and causes additional current to flow through divider resistors 1223 and 1225 from the +15 volt source to keep the base of transistor 1213 negative after termination of the signal from the strobe gate. Therefore, transistor 1213 will continue to conduct and the flip-flop will remain in its set state until the application of a reset pulse to its MR Reset terminal.

(9) Memory Register Indicator (FIG. 13)

FIG. 13 shows an indicating circuit 1311 which may be used with the MRFF unit of FIG. 12 to indicate the state of such a unit. The indicator circuit 1311 is usually connected to the reset side of the MRFF unit and comprises a grounded emitter transistor 1313 whose base is connected to an input resistor 1315 and to the base bias resistor 1317 and whose collector is connected to a negative voltage source through resistor 1319. A neon indicator lamp 1321 is connected across resistor 1319.

When the MR flip-flop is set, the $\overline{MR}$ signal is low, causing transistor 1313 to conduct and to turn on lamp 1321. When the MRFF unit is reset the lamp is off.

Figure 14:
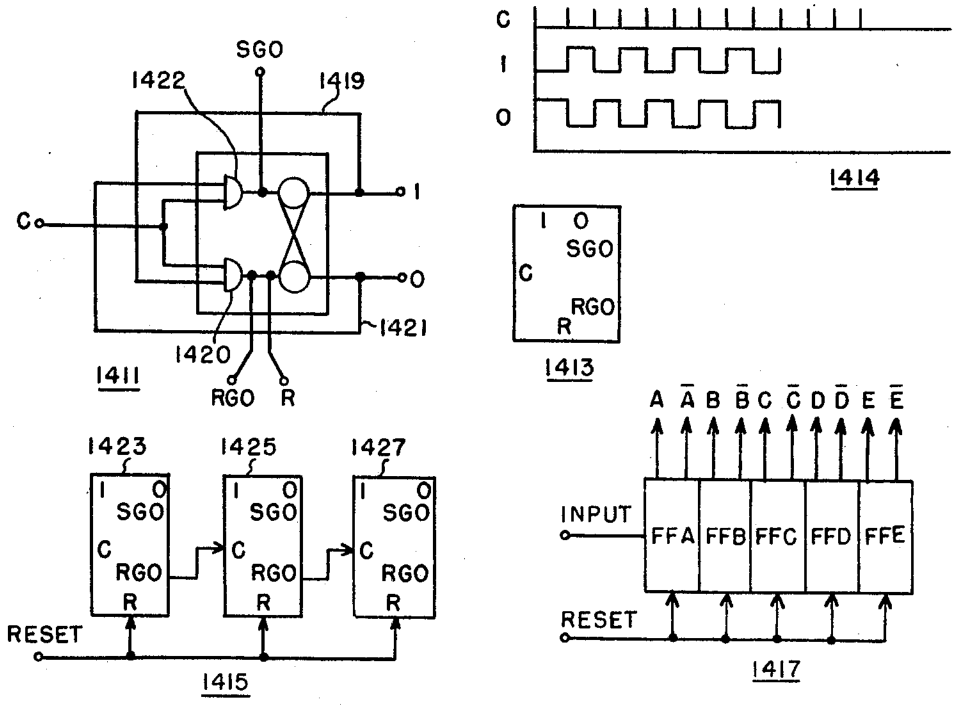
FIG. 14 is a block diagram of a typical binary counter.

(10) Binary Counter (FIG. 14)

FIG. 14 illustrates a complementing flip-flop 1411, the symbol 1413 for a complementing flip-flop, complementing flip-flop waveforms 1414, a binary counter 1415 and the symbol 1417 for a binary counter. The complementing flip-flop 1411 comprises the basic flip-flop 1111 as illustrated in FIG. 11, with the following modifications. The "1" output of the flip-flop is connected through line 1419 to the Reset gate 1420 of the flip-flop. The "0" output of the flip-flop is connected through line 1421 to the Set gate 1422 of the flip-flop; finally, a Set gate input and a Reset gate input are connected to a common point to form a single input, designated as C, to the complementing flip-flop. As may be seen upon inspection of the complementing waveforms 1414, it is the property of the complementing flip-flop that each clock pulse applied to its input reverses the state of the flip-flop.

1413 is a simplified symbol for the complementing flip-flop 1411. The symbol shows a "1" output and a "0" output, a common or C input, a Reset or R input, a SET gate output or SG0 and a RESET gate output or RG0, all inputs and outputs, corresponding to inputs and outputs of the complementing flip-flop 1411.

1415 is a three stage binary counter formed of three complementing flip-flops, each flip-flop being represented by its symbol 1413. The reset input of each stage is connected to a common reset line. A pulse source is connected to the C input of the first stage and the C input to each succeeding stage is connected to the RESET gate output or RG0 of the preceding stage. In operation, first the reset pulse will be applied to the reset input of each stage of the binary counter. This will cause "0" output of each stage to be high with the SET gate of each stage being enabled, and the "1" output of each stage to be low with the RESET gate of each stage being disabled. The first, and every succeeding clock pulse, applied to the first stage 1423 of the binary counter reverses the state of that stage so that the "1" output of that stage goes high with the first and each succeeding odd clock pulse. The second stage 1425 is switched every time the "1" output of the first stage 1423 goes from high to low, since it is at that time that a clock pulse can get through the reset gate of the first stage to the input of the second stage. Similarly, the third stage 1427 is switched each time the second stage 1425 goes from high to low. Thus the second stage 1425 is reversed half as often as the first stage 1423, and the third stage 1427 is reversed half as often as the second stage 1425.

Figure 18:
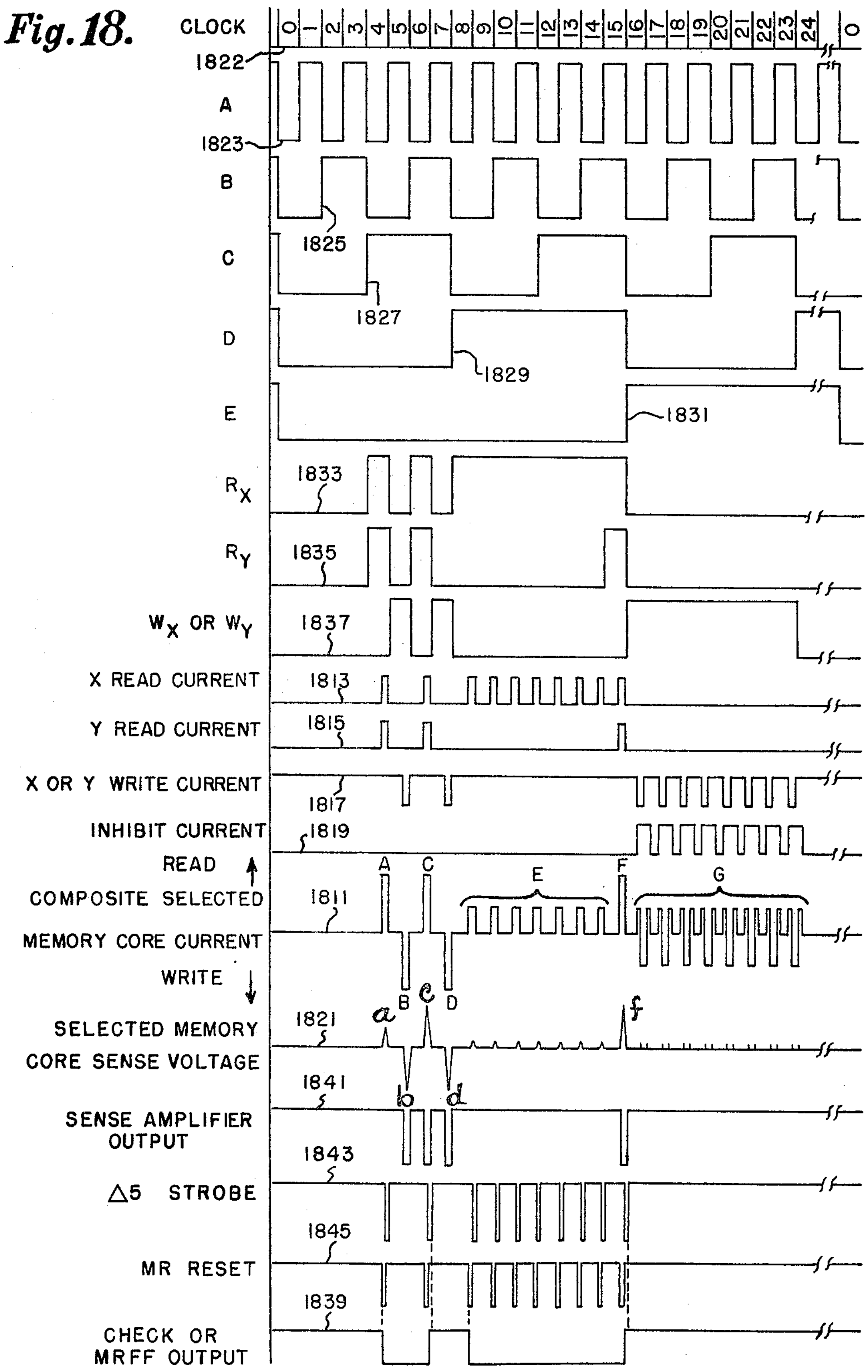
FIG. 18 is a diagram of current pulses in the system.

1417 is the symbol for a 5-stage binary counter, having a single input to the first stage, and a common reset input to each of the stages labeled respectively FFA, FFB, FFC, FFD and FFE. The outputs of the stages of the binary counter 1417 are indicated by letters corresponding with the designation of the particular stage. Thus the "1" output of FFA is A and the "0" output of FFA is $\overline{A}$. Correspondingly, FFB stage has outputs B and $\overline{B}$, and so on for the succeeding stages. The waveforms A through E, appearing at the outputs A, B, C, D and E of the binary counter as a result of a pulse train being fed to its input, are shown at the top of FIG. 18. FIG. 18 does not show the outputs $\overline{A}$, $\overline{B}$, $\overline{C}$, $\overline{D}$, and $\overline{E}$, but these may be determined easily since they are the complements or the inverse of the pulse trains A, B, C, D and E.

Figure 15:
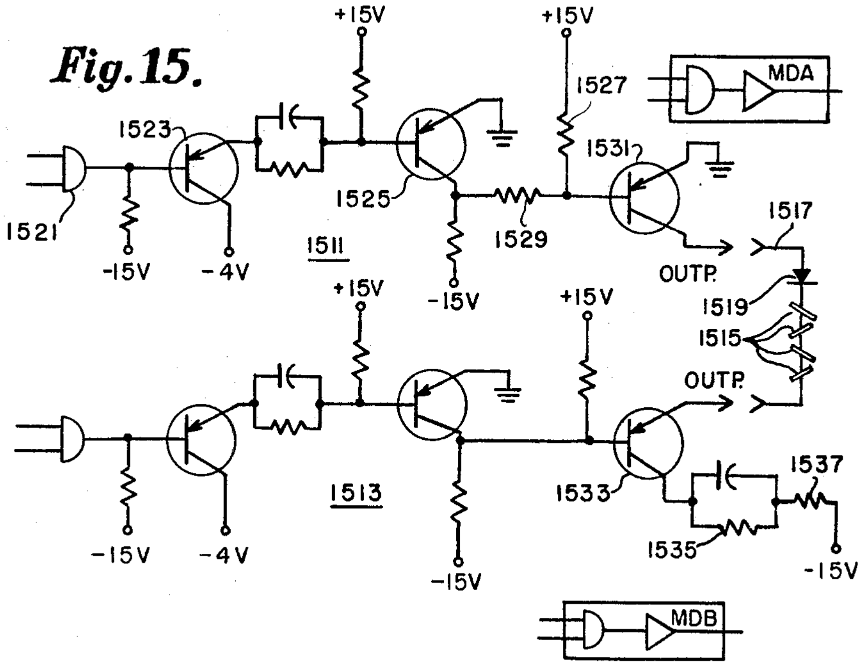
FIG. 15 is a circuit diagram of two types of memory drivers.

(11) Memory Drivers (FIG. 15)

The driver amplifiers which are used for driving current through a core in the memory matrix are shown in FIG. 15. Two types of drivers are used: memory driver A, 1511 and memory driver B, 1513. Memory drivers A and B will be referred to hereinafter as MDA and MDB, respectively. The logical symbols for the respective amplifiers are shown in the upper right-hand and lower right-hand corners of FIG. 15, respectively. Also illustrated in FIG. 15 is a column of cores 1515 linked by a single drive line 1517 in series with a steering diode 1519, whose function will be described in more detail in the subsequent discussion of the memory matrix.

MDA 1511 comprises a 3-stage transistor amplifier having an AND gate 1521 at its input. When the AND gate 1521 is enabled, the base of transistor 1523 is driven to approximately ground, causing a positive pulse to be coupled to the base of transistor 1525, the second stage of the amplifier. The grounded emitter transistor 1525 is turned off by the positive pulse and the collector of transistor 1525 falls to approximately −10 v. This causes transistor 1531 to turn on and to conduct heavily.

MDB 1513 is identical with MDA except for its last stage, 1533. Whereas the emitter of output transistor 1531 of MDA 1511 is connected to ground and the collector thereof is connected to the line 1517, the collector of output transistor 1533 of MDB 1513 is connected through resistor 1535 and resistor 1537 to a source of negative voltage, and it is the emitter of output transistor 1533 which is connected to the load, which is line 1517.

It may be seen that, when the input AND gates of MDA and MDB are enabled so as to turn on both drivers, the output stages 1531 and 1533 act as closed switches, in series with the line 1517, between ground and −15 volts.

E. MAGNETIC CORE MATRIX (FIG. 16)

Figure 16:
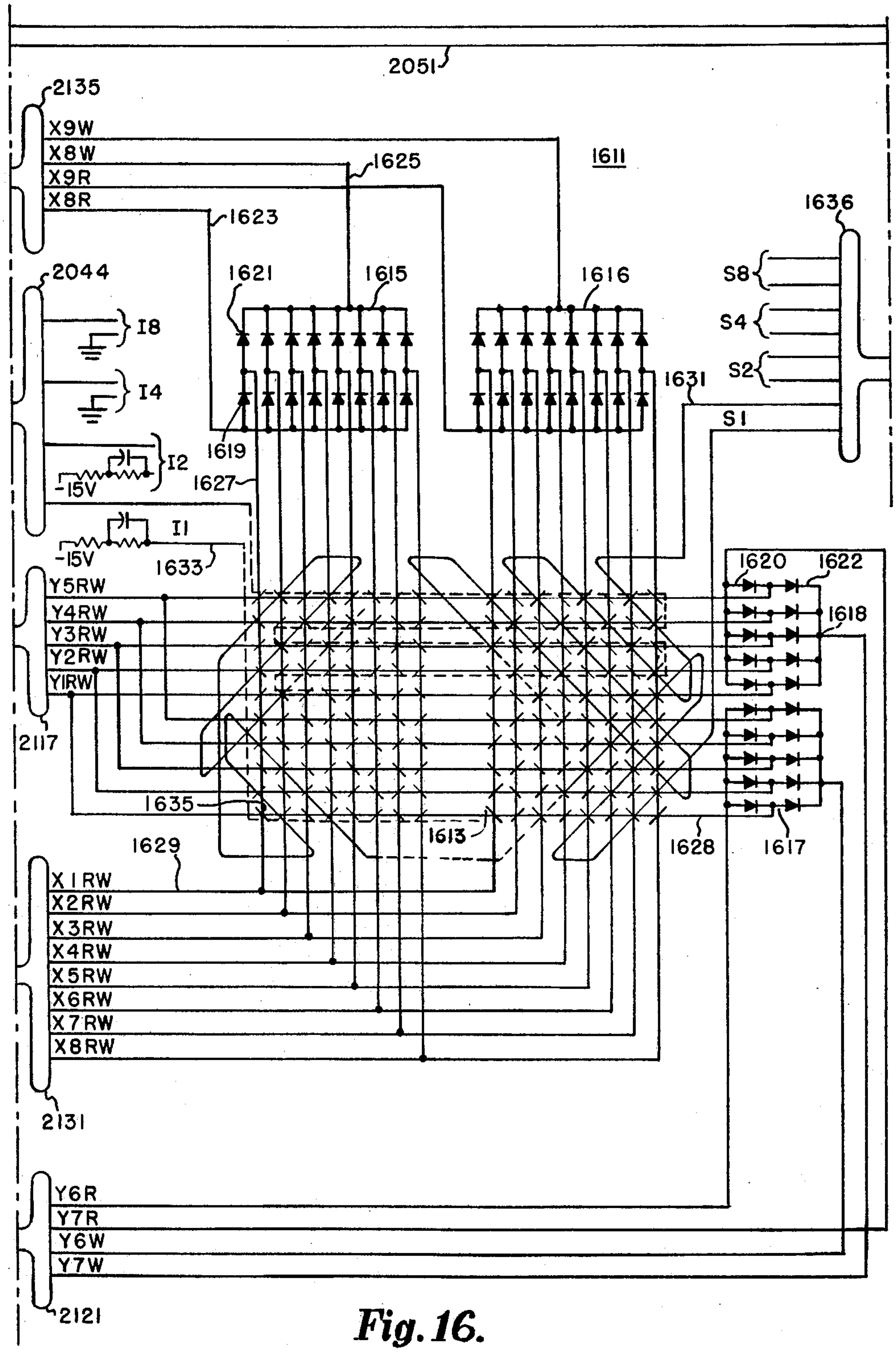
FIGS. 16, 19, 20, 21, 22, and 23 are joined to show a detailed schematic diagram of the entire system.

One type of magnetic core memory matrix that may be tested by the core tester is shown in FIG. 16. The matrix 1611 comprises a plurality of cores 1613 arranged in rows and columns. For purposes of selection, the cores are divided into groups of 8 columns and into groups of 5 rows; thus the matrix illustrated in FIG. 16, which has a total of 16 columns and 10 rows of cores, has two groups of columns and 2 groups of rows.

Each group of columns is associated with a set of steering diodes such as the set 1615 and, similarly, each group of rows is associated with a set of steering diodes such as the set 1617.

Each set of steering diodes comprises several pairs of diodes, on pair for each drive line. Each diode pair is connected in series, with the cathode of one diode 1619 of the pair being connected to the anode of the other diode 1621 of the pair. The anode of each diode 1619 is connected to a first current source, through line 1623, while the cathode of each diode 1621 is connected to a second current source, through line 1625. Finally, the junction point of each diode pair is connected to one end of one of the drive lines, such as drive line 1627. The other end of each drive line, such as drive line 1627, is connected to still another source of current through line 1629.

As will be explained more fully in connection with FIG. 17, any core may be selected for switching by energizing the current sources coupled to the drive lines linking that core. The matrix 1611 illustrated in FIG. 16 is typically one of a stack of four matrices, all of which may be tested by the memory tester. All cores 1613 in each plane are threaded by a sense winding 1631 criss-crossing the matrix. Similarly, all cores in each plane are threaded by an inhibit winding 1633. Finally, the X and Y drive lines link all of the matrices in the stack, with corresponding rows and columns of cores in the several matrices being linked respectively by common Y and X drive lines.

Usually each matrix serves to store a different bit in a multi-bit binary number, bits of a given stored number appearing at the same X–Y address in the four matrices. The illustrated matrix is that which would store the "1" bit of a four bit number, while the other three matrices, not shown in detail on FIG. 16, are indicated as those which would store the "2," "4" and "8" bit of the four bit binary number. Sense windings 1631 associated with the "1," "2," "4," and "8" bit matrices are labeled S1–S8 respectively, and are fed into harness 1636. Inhibit lines 1633 are similarly labeled I1–I8.

Figure 17:
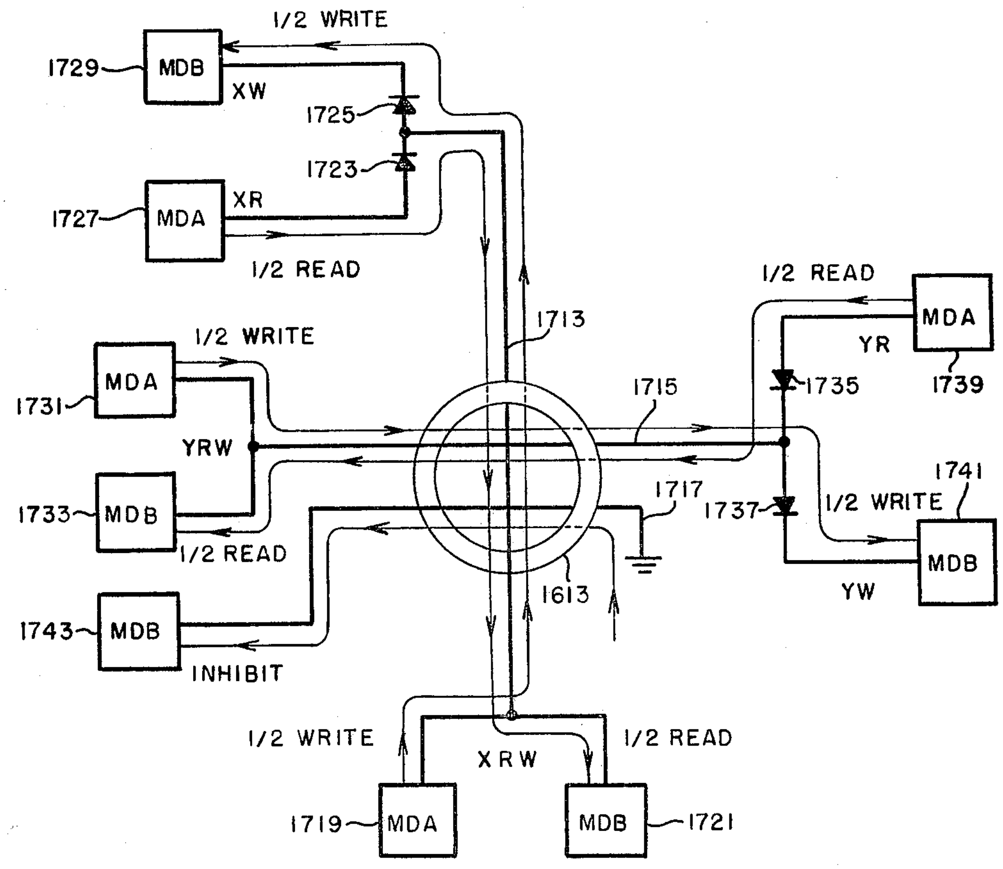
FIG. 17 is a schematic diagram of a single core with currents through selected drive lines coupling the core.

FIG. 17 shows one of the cores 1613 in the memory matrix 1611. It is coupled by the X drive line 1713 and the Y drive line 1715. The core is also linked by the INHIBIT line 1717. One end of the X drive line 1713 is connected to the joined output of MDA Driver 1719 and MDB Driver 1721. It will be recalled from FIG. 15, that the MDA is adapted to be a source of positive current, that is, a source from which current flows into a load, whereas the MDB is adapted to be a source of negative current, that is, a source into which current flows through a load. Thus, in combination an MDA and an MDB may be considered as a single bi-polar current driver. The other end of line 1713 is connected to the junction point of steering diodes 1723 and 1725. The anode of diode 1723 is connected to MDA 1727 and the cathode of diode 1725 is connected to MDB 1729. Similarly, one end of Y drive line 1715 is connected to the joined output of MDA 1731 and MDB 1733, while the other end of line 1715 is connected to the cathode of the steering diode 1735 and to the anode of steering diode 1737. The anode of steering diode 1735 is connected to MDA 1739 and the cathode of diode 1737 is connected to the output of MDB 1741. Thus, in effect each drive line is coupled at both ends by a bi-polar current driver comprising an MDA and an MDB.

The arrangement of amplifiers and steering diodes shown in FIG. 17 permits either a READ or a WRITE pulse to be applied to a core through a single line. The amplifiers are so designed that each of the drive lines 1713 and 1715 receives one-half the current necessary to reverse the state of the core. Thus, in order to achieve reversal, switching currents must flow coincidentally through both lines 1713 and 1715.

Let it be assumed that the core is so linked by the lines 1713 and 1715 that, to read the core, current must flow towards the left in line 1715 and downward in the line 1713. To read the core then, MDA 1727 and MDB 1721 are turned on. This will cause current to flow from MDA 1727 through diode 1723, through the line 1713 to MDB 1721. This gives one-half the necessary READ current. For the other half of the necessary READ current, MDA 1739 and MDB 1733 are turned on. This causes current to flow from MDA 1739 through diode 1735 through line 1715 to MDB 1733. If now it is desired to write into core 1613, the currents in both lines 1713 and 1715 may be reversed by enabling MDA 1719 and MDB 1729 to send one-half WRITE current through line 1713 and by turning on MDA 1731 and MDB 1741 for sending one-half WRITE current through the line 1715.

Returning to FIG. 16, it may now be seen how any desired core may be selected by energizing the proper combination of current sources coupled to the diode steering gates and to the drive lines. If, for example, it is desired to write into the core 1635 in the lower lefthand corner of the matrix 1611, it will be necessary to send half WRITE currents through the drive line 1627 and the drive line 1628 coupling the core 1635. This is readily accomplished by connecting the line X1RW to an MDA amplifier and the line X8W to an MDB amplifier and by connecting the line Y6W to an MDB amplifier and the line Y1RW to an MDA amplifier.

The size of the matrix described above is merely exemplary and should not be considered limiting. To the contrary, typical matrices tested by the magnetic core tester have more than two groups of X lines and Y lines. Similarly the number of lines in a group should not be considered limiting. The tester is equally suitable for use with a matrix having groups with more or less drive lines per group than the number described above.

F. COMPOSITE MEMORY CORE CURRENT (FIG. 18)

It is a prime function of the memory tester to generate a pulse train to be fed to the X and Y drive lines and to the inhibit line of the core to be tested. A composite memory core current especially suitable for thoroughly testing a core is that shown as wave train 1811 in FIG. 18. The wave train comprises a full READ current pulse followed by a full WRITE current pulse, then another full READ current pulse and another full WRITE current pulse. The purpose of these two pairs of full READ and WRITE current pulses is to test the reaction of the core to normal switching currents.

These first four pulses are followed by a string of 7 half READ current pulses E followed by a full READ current pulse F. It is the function of the pulse train E and the pulse F to test the core for resistance against core disturbance due to half-select currents. As more fully described at pp. 376–385 of Digital Application of Magnetic Devices by Meyerhoff et al., published by John Wiley and Sons, Inc., 1960, a defective core may switch under the influence of a series of non-coincidental half-select currents. Thus, such a defective core will be switched by the half currents in the pulse train E. The pulse F following the pulse train E is a full READ current and will cause a good core, which remained substantially undisturbed by the pulse train E, to switch. The pulse train G comprises a series of INHIBIT current pulses superimposed upon a series of full WRITE current pulses. A good core will be kept from switching by the INHIBIT current. A defective core will not, and it is the function of the pulse train G to check the core for this tendency.

The composite current 1811 does not really exist as such but represents the combined magnetomotive force of currents flowing through the Y drive line 1715, the X drive line 1713 and the INHIBIT line 1717, of FIG. 17. The pulse trains which must be applied to the X, Y and INHIBIT lines are shown as pulse trains 1813, 1815, 1817, and 1819. 1813 is the X READ current, driven through the X drive line 1713 by MDA 1727 and MDB 1721. 1815 is the Y READ current, driven through the Y drive line 1715 by MDA 1739 and MDB 1733. 1817 is the waveform representing the X WRITE current driven through line 1713 by MDA 1719 and MDB 1729, and the Y WRITE current driven through line 1715 by MDA 1731 and MDB 1741. Finally, the waveform 1819 represents the INHIBIT current, driven through the line 1717 by MDA 1743. The waveform 1811, then is the composite of the four waveforms 1813, 1815, 1817 and 1819.

G. DETAILED DESCRIPTION OF SUB-SYSTEMS

Figure 2:
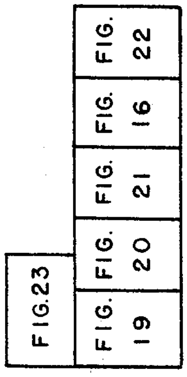

In the following discussion sub-systems shown in FIGS. 19, 20, 21, 16, 22 and 23 will be described individually. However, since these systems cooperate to form the entire core tester, understanding of each sub-system will be aided by assembling all sub-system drawings according to FIG. 2.

(1) PULSE TRAIN GENERATOR (FIG. 19)

Figure 19:
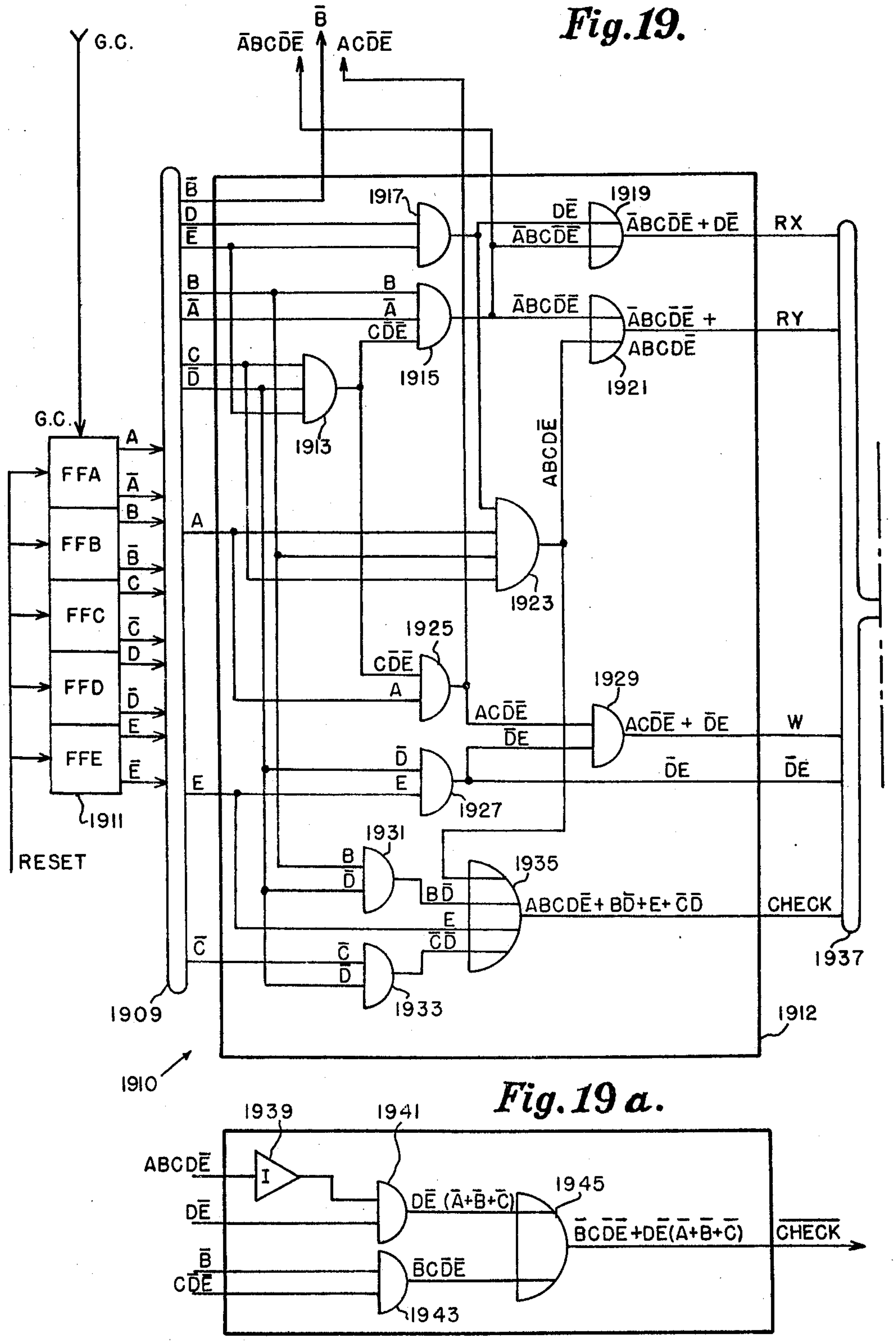

FIG. 19 illustrates the pulse train generator 1910 for generating several trains of pulses from which the core READ and WRITE currents, the core INHIBIT current and other currents for the system may be derived. The pulses produced by the pulse train generator are logic pulses, which last for one or more clock periods. It is their function to enable a timing pulse to get through an AND gate during selected clock periods.

The pulse train generator 1910 comprises the binary counter 1911, which was described previously in connection with FIG. 14, and of a logic circuit assembly 1912. The counter 1911 is stepped by a gated clock pulse train 1822, generated by the clock portion of the system (not shown) and having a period of approximately 11 micro-seconds between clock pulses. The counter has five stages, FFA through FFE, and its "1" outputs are represented in FIG. 18 by waveforms 1823 to 1831. The waveform 1823 is the "1" output of FFA and is labeled "A." The waveform 1825 is the "1" output of FFB and is labeled "B," and so on for waveforms 1827, 1829, and 1831. The "0" output of each stage, labeled $\bar{A}$ through $\bar{E}$ in FIG. 19 is the complement of its "1" output and is not shown in FIG. 18. The outputs of binary counter 1911 are connected to the logic circuit assembly 1912 through harness 1909.

The logic pulse train 1833, labeled RX on FIG. 19 is created by the AND gates 1913, 1915 and 1917 and by the OR gate 1919. Binary counter outputs C, $\bar{D}$ and $\bar{E}$ are fed to AND gate 1913. The output of AND gate 1913, $C\bar{D}\bar{E}$ and the binary counter outputs $\bar{A}$, B are fed to AND gate 1915. Therefore the output of AND gate 1915 is $\bar{A}BC\bar{D}\bar{E}$. The AND gate 1917 receives at its input binary counter outputs D and $\bar{E}$. The OR gate 1919 receives at its inputs the output of AND gates 1915 and 1917 and its output is, therefore, $\bar{A}BC\bar{D}\bar{E}+\bar{D}\bar{E}$. This means that the output of OR gate 1919 will be high when either of the following two conditions exists: (1) when flip-flop outputs $\bar{A}$, B, C, $\bar{D}$ and $\bar{E}$ are all high, or (2) when the flip-flop outputs $\bar{D}$ and $\bar{E}$ are both high.

From an inspection of the waveforms 1823 through 1831, it may be seen that these conditions exist during the fourth and sixth clock pulse period and during the clock pulse periods 8 through 15. The pulse train 1833 of FIG. 18 which represents RX, the output of OR gate 1931, is therefore high during the periods 4, 6, and 8 through 15.

The pulse train RY, represented on FIG. 18 as waveform 1835, is derived from AND gates 1913, 1915, 1917 and 1923 and from OR gate 1921. The output of AND gate 1915, as explained with respect to pulse train RX, is $\bar{A}BC\bar{D}\bar{E}$. Binary counter outputs A, B and C and the output $D\bar{E}$ of AND gate 1917 are fed to AND gate 1923 whose output is thus $ABCD\bar{E}$. The outputs of AND gates 1915 and 1923 are fed to OR gate 1921. Consequently, the output of OR gate 1921 is $\bar{A}BC\bar{D}\bar{E}+ABCD\bar{E}$. Inspection of the waveforms 1823 through 1831 of FIG. 18 will show that output of OR gate 1921 will be high only during the clock periods 4, 6 and 15. This is shown on the waveform 1835 of FIG. 18.

The $W_x$ and $W_y$ wave train, shown as 1837 on FIG. 18 and referred to on FIG. 19 as W, is derived from AND gates 1913, 1925, 1927 and from OR gate 1929. The AND gate 1925 receives as its inputs the output of $C\bar{D}\bar{E}$ of AND gate 1913, and binary counter output A. Therefore the output of AND gate 1925 is $AC\bar{D}\bar{E}$. The inputs to AND gate 1927 are binary counter outputs $\bar{D}$ and E, making its output $\bar{D}E$. The outputs of AND gates 1925 and 1927 are fed to the inputs of OR gate 1929, making the output of OR gate 1929 $AC\bar{D}\bar{E}+\bar{D}E$. Therefore, the pulse train W, represented in FIG. 18 as waveform 1837, will be high during the clock periods 5, 7 and 16 through 23.

As will be described more fully hereinafter, the outputs of AND gates 1915, 1925 and 1927 are utilized apart from the composition of pulse trains RX, RY and W, as logic pulses in other parts of the system.

The last logical wave train generated by the pulse train generator 1910 is the MR CHECK wave train designated on FIG. 18 as the wave train 1839. As will be described more fully in a subsequent section, it is the function of this wave train to simulate the output of an MR flip-flop responding to the output of a good core under test. The check pulse wave train 1839 is derived from AND gates 1931, 1933, and 1923 and from OR gate 1935. The inputs to AND gate 1931 are binary counter outputs B and $\bar{D}$. The inputs to AND gate 1933 are binary counter outputs $\overline{CD}$. The inputs to OR gate 1935 are the output of AND gate 1923, $ABCD\overline{E}$, the output of AND gate 1931, $B\overline{D}$, the output of AND gate 1933, $\overline{C}\overline{D}$ and binary counter output E. Thus, the output of OR gate 1935 is the logical pulse train $$ABCD\overline{E}+B\overline{D}+E+\overline{C}\overline{D}$$

This logical pulse train, shown as waveform 1839 in FIG. 18, is high during the clock periods 0 through 3, 6, 7, and 16 through 31.

FIGURE 19(*a*) shows an optical addition to the logic circuit assembly 1912 and may be used to generate the inverse of the CHECK pulse train.

The LOGIC pulse train $ABCD\overline{E}$, derived from the output of AND gate 1923 is inverted by inverter 1939 and fed from it to one input of AND gate 1941. The logic symbol, $D\overline{E}$ derived from the output of AND gate 1917, is fed to the other iput of AND gate 1941 whose output is therefore $D\overline{E}(\overline{A}+\overline{B}+\overline{C})$. The $\overline{B}$ output of binary counter 1911 is fed to one input of AND gate 1943 of the optional logic circuit of FIGURE 19(*a*) while the other input of AND gate 1943 receives the logical output $C\overline{D}\overline{E}$ of AND gate 1913. The output of AND gates 1941 and 1943 are connected to individual inputs of OR gate 1945 whose output will be $\overline{B}C\overline{D}\overline{E}+D\overline{E}(\overline{A}+\overline{B}+\overline{C})$. This logical function is $\overline{\text{CHECK}}$ or the inverse of the CHECK pulse train derived from the output of OR gate 1935. Explanation of the purpose of this logic function appears at the end of section G(5) of this application.

Figure 20:
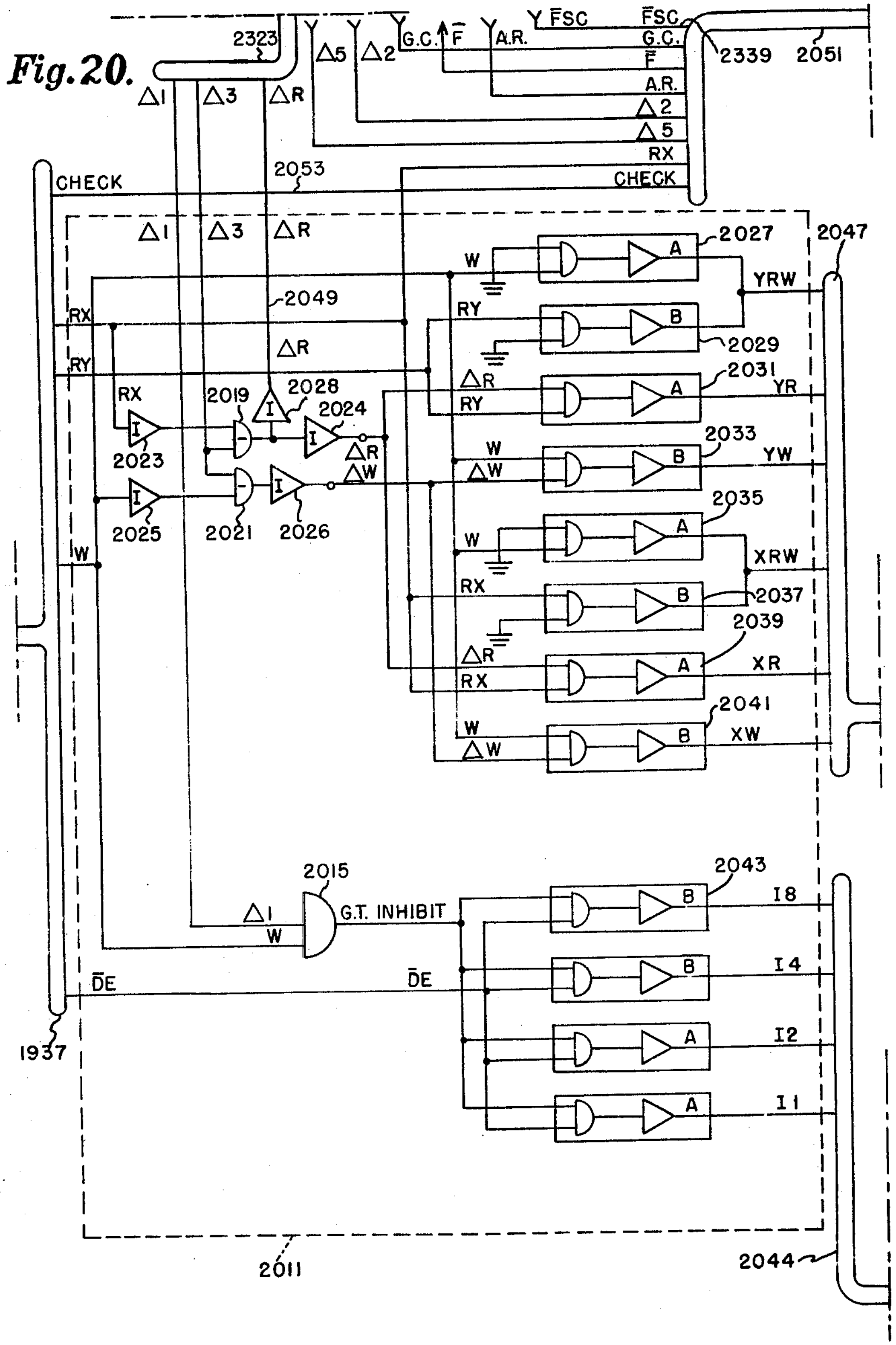
Figure 23:
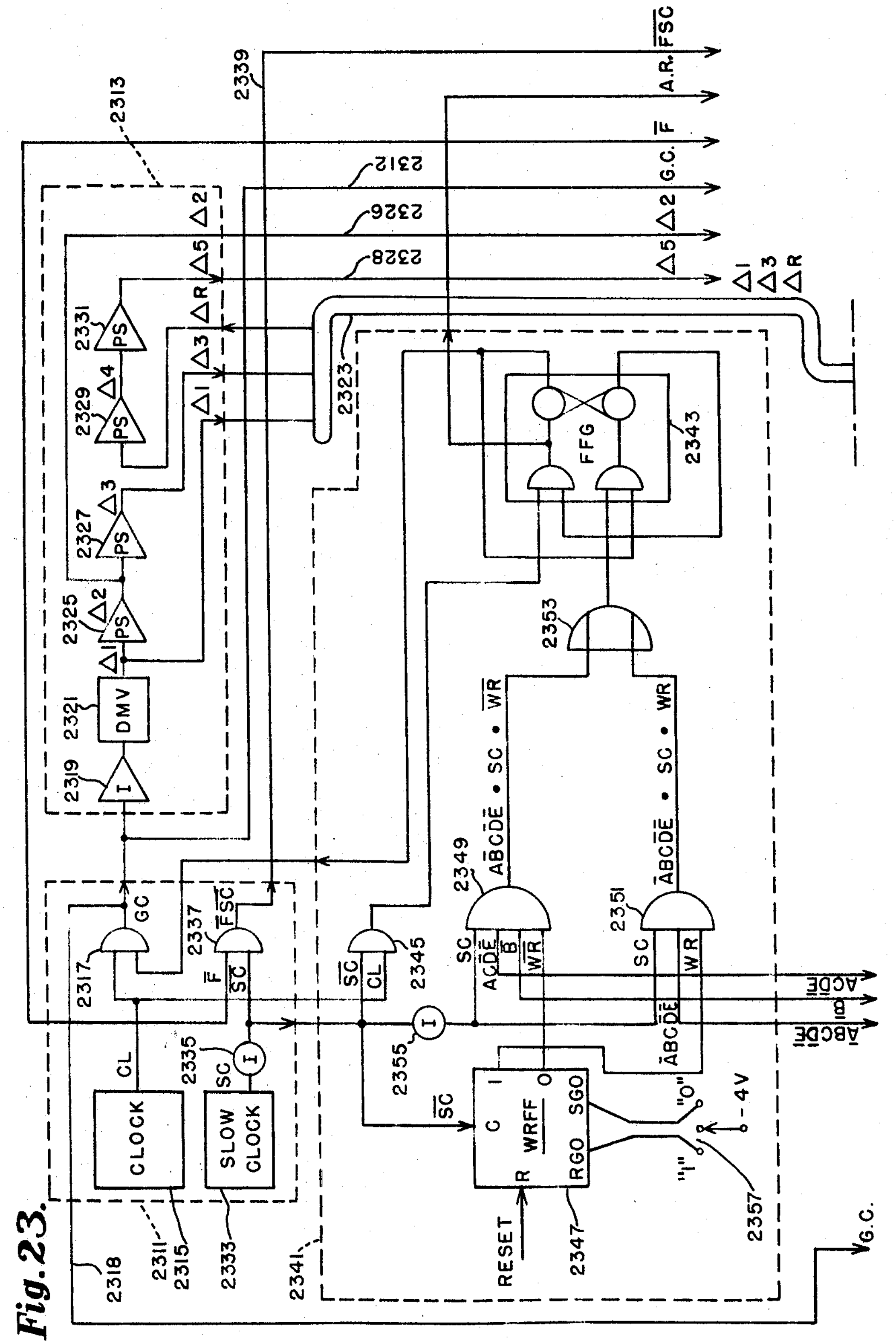
Figure 25:
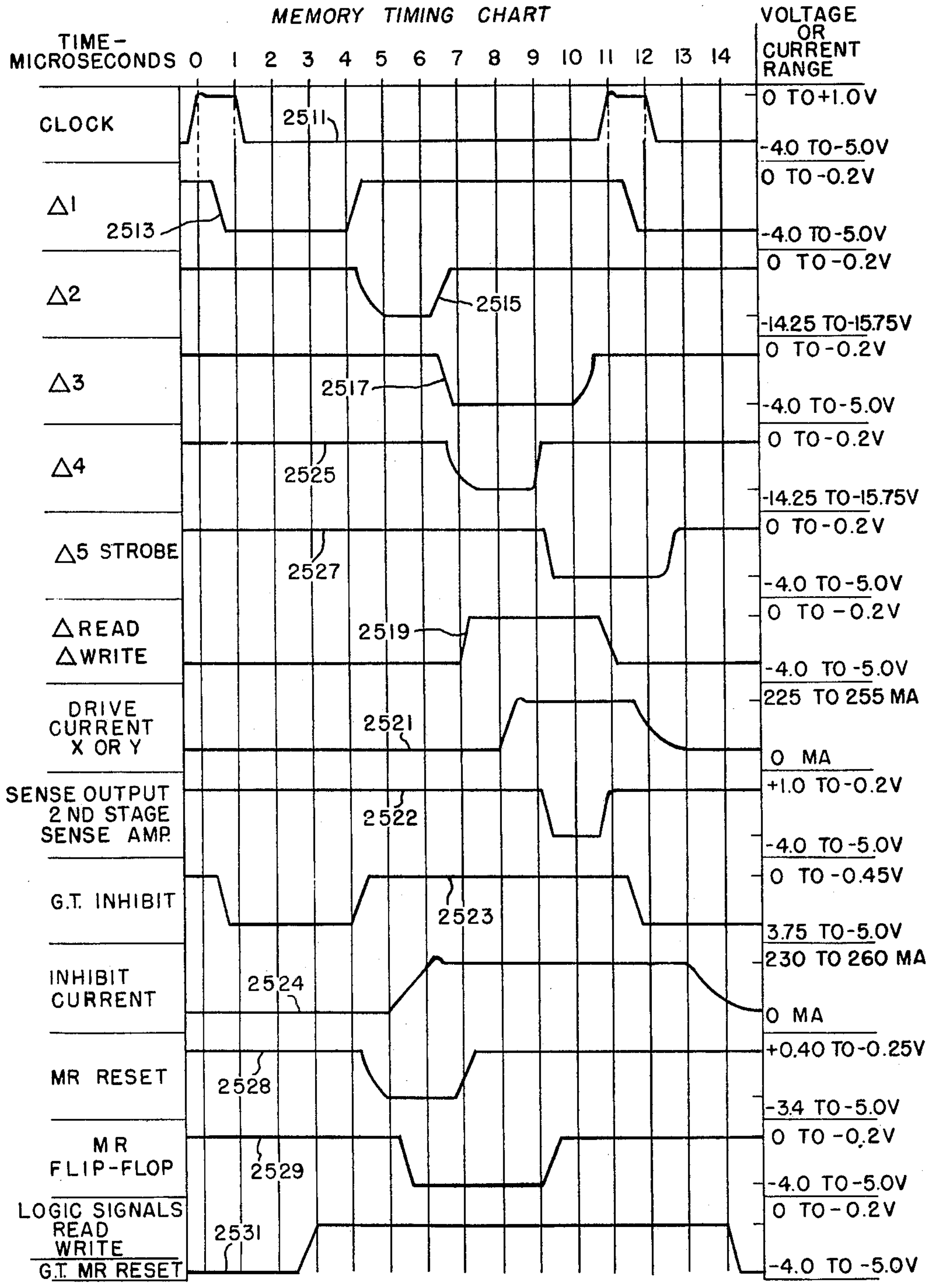
FIG. 25 is a timing diagram of pulses in the system.

(2) Current mixer, clock, and timing system (FIGS. 20, 23 and 25)

The outputs RX, RY, W, DE and MR CHECK, of pulse train generator 1912, are fed to harness 1937 which is coupled to a harness of the same number in FIG. 20. FIG. 20 comprises the magnetic core drive and inhibit current mixer 2011. It is the function of the mixer 2011 to generate the appropriate driving and inhibit currents during portions of the logic pulses comprising the pulse trains RX, RY, W and MR CHECK. The mixer 2011 is operated upon by the clock system 2311 and the timing system 2313 of FIG. 23.

The clock system 2311 includes a multivibrator 2315 of the type described in connection with FIG. 10. Multivibrator 2315 generates the clock pulses labeled CL. As shown by the waveform 2511 of FIG. 25, each clock pulse is about 1 micro-second long, while each clock pulse period, that is, the time between leading edges of consecutive clock pulses, is about 11 microseconds long. The clock pulse output of multivibrator 2315 is fed through AND gate 2317 which is enabled during normal operation of the system by means which will be described subsequently. The output of AND gate 2317 is labeled GC for gated clock. The GC output of AND gate 2317, shown as wave train 1822 in FIG. 18 is fed by line 2318 to the input of Binary Counter 1911 for stepping it. GC is also coupled to the delay multivibrator (or DMV) 2321 through inverter 2319. The inverter 2319 of the timing system 2313 is employed to match the output of AND gate 2317 to the DMV 2321 which is operated by a negative pulse. In response to each gated clock pulse coupled to its input, the DMV 2321 generates a pulse Δ1 shown in FIG. 25 as waveform 2513. Timing pulse Δ1 is negative, and lasts approximately four micro-seconds, commencing during the first and ending during the fifth micro-second of a clock period. Through harness 2323 the Δ1 pulse is coupled to the AND gate 2015 of mixer 2011 in FIG. 20.

The Δ1 pulse also serves as the input to pulse standardizer 2325 of the timing system 2313 in FIG. 23. PS 2325 generates pulse Δ2 in response to Δ1. The pulse Δ2, shown in FIG. 25 as waveform 2515, is also negative, and lasts 2 micro-seconds, commencing during the fifth and ending during the seventh micro-second of a clock period.

The trailing edge of pulse Δ2 triggers pulse standardardizer 2327 which in turn generates the timing pulse Δ3, shown on FIG. 25 as pulse 2517. Δ3 is again negative, and lasts for about four micro-seconds, commencing during the seventh and ending during the eleventh, or last micro-second of the clock period. The Δ3 pulse is fed from pulse standardizer 2327, through harness 2323 to negative AND gates 2019 and 2021 in mixer 2011 of FIG. 20. Negative AND gate 2019 also receives, at its other input, the logic pulse train RX inverted by the inverter 2023 which serves to accommodate the polarity of the negative AND gate 2019. Similarly, the negative AND gate 2021, which is gated with the timing pulse Δ3, reecives at its other input the logic pulse train W inverted by inverter 2025. The output of AND gate 2019 is inverted individually by inverters 2024 and 2028 to provide the positive pulse ΔR at the individual inverter outputs, and the output of AND gate 2021 is inverted by inverter 2026 to produce the pulse ΔW. The ΔR and ΔW pulses are shown in FIG. 25 as the pulse 2519 and may be observed to occur during the time that the Δ3 timing pulse 2517 exists.

Timing system 2313 also includes pulse standardizers 2329 and 2331 for generating strobe pulse Δ5. PS 2329 is triggered by the ΔR output of inverter 2028, fed to PS 2329 through line 2049 and harness 2323. PS 2329 is triggered by the leading edge of the ΔR pulse and generates the negative pulse Δ4 shown in FIG. 25 as waveform 2525.

The trailing edge of Δ4 triggers PS 2331 which generates in response thereto the strobe pulse Δ5 shown in FIG. 25 as waveform 2527. It will be observed that the leading edge of timing pulse Δ5 trails the leading edge of gated pulse ΔR by the length of timing pulse Δ4, and, that timing pulse Δ5 can occur only in that clock period in which the ΔR pulse has previously occurred.

The Drive and INHIBIT current mixer 2011 has eight memory drivers of the type illustrated in FIG. 15 and previously discussed with respect to FIG. 17. MDA 2027 and MDB 2033 are provided for driving a WRITE current through the Y drive line of a core under test. One input terminal of MDA 2027 is grounded. The other input terminal of MDA 2027 is connected to the W output of pulse train generator 1910 through harness 1937. One input terminal of MDB 2033 is also connected to the W output of pulse train generator 1910. The other input terminal of MDB 2033 is connected to the output of inverter 2026 and receives the pulse ΔW therefrom.

Since the input terminals of MDA 2027 and MDB 2033 must all be simultaneously raised to a high, or approximately ground level in order for a Y WRITE current to be generated by these memory drivers, the Y WRITE current will flow during those clock periods in which a W logic pulse occurs and more specifically, during that portion of such clock periods when the ΔW pulse exists.

MDA 2031 and MDB 2029 are provided for driving a READ current through the Y drive of a core under test. One input terminal of MDB 2029 is connected to ground. The other input terminal of MDB 2029 is connected to the RY output of pulse train generator 1910. One input terminal of MDA 2031 is also connected to the RY output of pulse train generator 1910. The other input terminal of MDA 2031 is connected to the output of the inverter 2024 receiving the gated pulse ΔR therefrom. MDB 2029 and MDA 2031 will be turned on and will drive a full READ current through the Y drive line during those clock periods in which the RY logic pulse occurs, but only during that portion of such clock periods during which the gated pulse ΔR exists.

MDA 2035 and MDB 2041 are provided for driving a WRITE current through the X drive line of a core under test. One input terminal of MDA 2035 is connected to ground. The other input terminal of MDA 2035 is connected to the W output of pulse train generator 1910. One input of MDB 2041 is also connected to the W output of pulse train generator 1910. The other input of MDB 2041 receives the ΔW pulse from the output of inverter 2026. The memory drivers 2035 and 2041 will be turned on by the logic pulse W and the gated pulse ΔW to drive a WRITE current through the X drive line of a core under test during a portion of those clock periods in which a W logic pulse occurs, that portion being defined by the time within the clock period during which the ΔW pulse exists.

MDA 2039 and MDB 2037 are provided to drive a READ current through the X drive line of a core under test. One input terminal of MDB 2037 is grounded. The other input terminal of MDB 2037 is connected to the RX output of pulse train generator 1910. One input terminal of MDA 2039 is also connected to the RX output of pulse train generator 1910. The other input terminal of MDA 2039 is connected to the output of inverter 2024 to receive the gated pulse ΔR therefrom. MDA 2039 and MDB 2037 will be turned on by RX and ΔR pulses and will drive a READ current through the X drive line of a core under test during a portion of those clock periods in which the RX logic pulse occurs, that portion being defined by the time during which the pulse ΔR exists.

To recapitulate, each of the four drive currents, the X READ current, the X WRITE current, the Y READ current and Y WRITE current, is driven through a drive line by a pair of memory drivers. One driver of each pair is turned on by a logic pulse which extends for an entire clock period, as shown by waveform 2531 of FIG. 25. The other driver of each pair is turned on by the coincidental application to its input of a logic pulse and a gated pulse which occurs during only a portion of a clock period. This gated pulse is either a ΔR or ΔW pulse and occurs during a time defined by the Δ3 timing pulse. Consequently, all four drive currents will occur during the period defined by the Δ3 timing pulse.

Mixer 2011 also includes four INHIBIT drivers 2043, comprising two MDA and two MDB units. Each INHIBIT driver 2043 is provided for driving an INHIBIT current through all cores in a different plane of a multiplane matrix assembly. Since the illustrated matrix in FIG. 16 has four planes with the 1, 2, 4 and 8 bit planes having inhibit windings labeled I1, I2, I4, and I8 respectively, four INHIBIT drivers 2043 are shown in the mixer 2011. The four INHIBIT drivers having outputs labeled I1, I2, I4, and I8, are individualy connected through harness 2044 to corresponding inhibit lines 1633 of matrix 1611. The AND gates of the four INHIBIT drivers 2043 each have first and second input terminals. The first input terminal of each AND gate is connected to the output of AND gate 2015. The second input terminal of each AND gate of the INHIBIT drivers 2043 is connected to the $\overline{D}$E output of pulse train generator 1910 through harness 1937.

The AND gate 2015 has two inputs. One input is the pulse train W, received from pulse train generator 1910 through harness 1937. The other input is the timing pulse Δ1, received through harness 2323 from the DMV 2321. The clock periods during which the INHIBIT drivers 2043 are actuated is determined by the logic pulse train W and by the logic function $\overline{D}$E. From an inspection of the wave train W shown in FIG. 18 as 1837, and of the logic functions D and E, shown on FIG. 18 as 1829 and 1831 respectively, it may be seen that, as shown by waveform 1819, the INHIBIT current will exist during the clock periods 16 through 23. The portion of these clock periods during which the INHIBIT drivers 2043 are on is determined by the timing pulse Δ1.

As seen in FIG. 25, the timing pulse Δ1 is low for approximately the first four micro-seconds of a clock period and is high for the remaining approxmiately seven micro-seconds of a clock period. Therefore, it is during the last 7 micro-seconds of a clock period that an INHIBIT current exists. Thus, the G.T. INHIBIT signal, which is the output of AND gate 2015 and is shown as the waveform 2523 in FIG. 25, is high during the 5th to the 11th micro-second of a clock period. With the normal delay inherent in the circuit, the INHIBIT current produced by the INHIBIT drivers 2043 will commence during the 6th micro-second of a clock period and will end during the first micro-second of the next clock period, as shown by the waveform 2524 in FIG. 25.

From an inspection of the INHIBIT current 2524 and the DRIVE current 2521, it may be observed that the DRIVE current falls approximately in the middle of the INHIBIT current as a result of the timing of the DRIVE current with the timing pulse Δ3 and of the timing of the INHIBIT current with the timing pulse Δ1. Thus, the desired superposition of inhibit pulses upon the WRITE current pulses, shown in the G portion of wave train 1811 of FIG. 18, is achieved.

Figure 21:
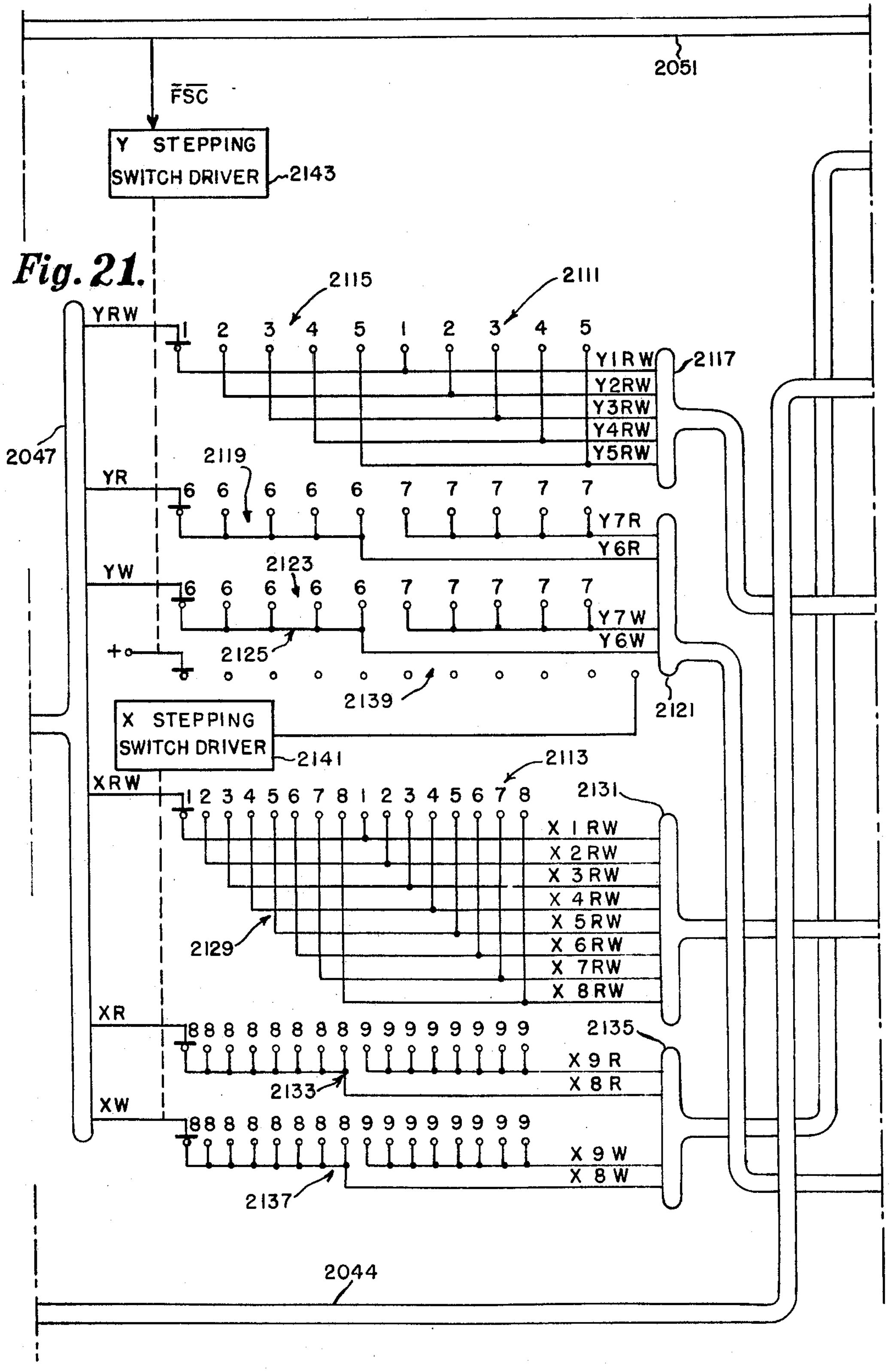

(3) Stepping switches (FIG. 21)

The outputs of the memory drivers 2027 through 2041 of DRIVE and INHIBIT currrent mixer 2011 are connected through the harness 2047 to the Y stepping switch 2111 and to the X stepping switch 2113. It is the function of the X and Y stepping switches to apply the composite selected memory core current to successive cores in the matrix 1611 in FIG. 16. Typically, both switches will be of the rotary type. As shown in FIG. 21, the Y switch has four decks of contacts. The first deck 2115 serves to apply in sequence the output YRW of the mixer 2011 to different sets of Y drive lines in the matrix 1611. As was mentioned in connection with the previous description of matrix 1611, the Y Drive lines are divided into two groups of five at one end of the matrix, Y drive lines of a corresponding order in each group being connected to each other. Thus, the bottom drive lines of both groups in the matrix are joined at a terminal labeled Y1RW. Similarly, the Y drive lines which are the second from the bottom of each group are joined at a point labeled Y2RW. Points Y3RW, Y4RW and Y5RW are simliarly joined with Y drive lines which are third, fourth and fifth from the bottom of their respective groups.

The top Y switch deck 2115 has two sets of five contacts with each set being provided for one group of Y lines in the matrix 1611. Corresponding contacts in the two sets are joined. Thus the first contact in each set is connected to a common point labeled Y1RW. The second contact in each set is connected to a point labeled Y2RW. By a similar process, the points Y3RW, Y4RW and Y5RW are formed. Each of the points Y1RW through Y5RW of the Y switch deck 2115 is connected to corresponding points of the matrix 1611 through the harness 2117. Thus, as the wiper of the switch deck 2115 steps along the contacts of the switch, the YRW output of the drivers 2029 and 2031 is applied in sequence to the Y drive lines of the matrix in ascending order.

The second deck 2119 of the Y switch 2111 is provided for applying the YR output of the mixer 2011 to the joined anodes of successive steering diode sets 1617 and 1618 of the matrix 1611. The anode input line to the bottom steering diode set 1617 is labeled Y6R. The anode input line to the top steering diode set 1618 is labeled Y7R. The first five contacts of the Y switch deck 2119, labeled 6, are joined to form a common line labeled Y6R. The second group of five contacts of switch deck 2119, labeled 7, are joined to form a common line labeled Y7R. The lines Y6R and Y7R are connected, respectively, through harness 2121 to similarly labeled input lines of the steering diode sets 1617 and 1618. Thus, the YR output of mixer 2011 is connected during the first five steps of stepping switch 2111 to the Y6R input of steering gate set 1617 and is connected during the subsequent five steps of the switch to the steering gate set 1618.

The third deck 2123 of switch 2111 serves to apply the YW output of mixer 2011 to the cathodes of steering diode sets 1617 and 1618. The cathodes of steering diode set 1617 are coupled to an input line labeled Y6W. The cathodes of steering diode set 1618 are coupled to an input line labeled Y7W. The first five contacts of switch deck 2123 are connected together to form the line Y6W. The second set of five contacts of switch deck 2123 is joined to form a line Y7W. The lines Y6W and Y7W of switch deck 2123 are connected through harness 2121 to the similarly labeled input lines of steering diode sets 1617 and 1618. Thus, during the first five steps of switch 2111 the YW output of mixer 2011 is connected to the cathodes of steering diode set 1617 through line Y6W and harness 2121. During the second set of five steps, that is, during the sixth through the tenth step of stepping switch 2111, the YW output of mixer 2011 is connected to the cathodes of steering diode set 1618 through line Y7W and harness 2121. An inspection of the switch connections just described will show that, as the stepping switch 2111 is stepped along its ten contacts, the combined YRW, YR, and YW outputs of mixer 2011 will be applied to the Y lines 1628 in sequence beginning with the bottom Y drive line and proceeding upward, ending with the top Y drive line.

The function of the X stepping switch 2113 is to apply the combined XRW, XR and XW outputs of mixer 2011 in sequence to the X drive lines 1627 of the matrix 1611. The XRW output is applied to the matrix 1611 through switch deck 2129. The deck has two sets of eight contacts, each set having contacts numbered from 1 to 8 with contacts having the same number being connected to each other to form a common line. Thus, the first contact of each set is connected to a common point labeled X1RW. The second contact of each set is connected to a common point labeled X2RW and so on up to the common point X8RW.

As earlier described in the discussion of matrix 1611, the X drive lines 1627 are divided into two groups of eight X drive lines of a corresponding order in each group being connected to each other at one end. Thus, the left-most winding in each group in the matrix is connected to an input line labeled X1RW. The next drive line in each group is connected to an input line labeled X2RW. Lines X3RW through X8RW are similarly formed with X drive lines which are third through eighth in their respective groups. The input lines X1RW through X8RW are all connected to the bottom ends of the X drive lines 1627. The top ends of the X drive lines are individually connected to diode pairs in the steering diode sets 1615 and 1616.

Each point of the terminals X1RW through X8RW of the X switch deck 2129 is connected to a corresponding input line of the matrix 1611 through the harness 2131.

The second deck 2133 of X switch 2113 is provided for applying the XR output of the mixer 2011 to the joined anodes of successive steering diode sets 1615 and 1616 of the matrix 1611. The anode input line to the left steering diode set 1615 is labeled X8R. The anode input line to the right steering diode set 1616 is labeled X9R. The first eight contacts of the X switch deck 2133, labeled 8, are joined to form a common line labeled X8R. The second group of eight contacts of switch deck 2133, labeled 9, are joined to form a common line labeled X9R. The lines X8R and X9R are connected, through harness 2135 to similarly labeled input lines of the steering diode sets 1615 and 1616. Thus, the XR output of mixer 2011 is connected during the first eight steps of X stepping switch 2113 to the anodes of steering gate set 1615, and is connected during the next eight steps of the switch to the anodes of steering gate set 1616.

The third deck 2137 of X switch 2113 serves to apply the XW output of mixer 2011 to the joined cathodes of steering diode sets 1615 and 1616. The cathodes of steering diode set 1615 are connected to an input line labeled X8W. The cathodes of steering diode set 1616 are coupled to an input line labeled X9W. The first eight contacts of switch deck 2137 are connected together to form a line X8W. The second set of eight contacts of switch deck 2137 is joined to form a line X9W. The lines X8W and X9W of switch deck 2137 are connected through harness 2135 to the similarly labeled input lines of steering diode sets 1615 and 1616. Thus, during the first eight steps of switch 2113 the XW output of mixer 2011 is connected to the cathodes of steering diode set 1615 through line X8W and harness 2135. During the next eight steps the XW output of mixer 2011 is connected to the cathodes of steering diode set 1616 through line X9W.

An inspection of the stepping switch connections just described will show that, as the switch 2113 is stepped along its sixteen contacts, the combined XRW, XR, and XW outputs of mixer 2011 will be applied to the drive lines 1627 in sequence, beginning with the left-most drive line and proceeding towards the right, ending with the right-most X drive line.

The X and Y switches are arranged for stepping from core to core in a column and then stepping to the bottom core of the next column for testing in sequence the cores in that column and so on. To this end the Y switch is designed to step through its range of ten contacts before the X switch is caused to make one step along its contacts. This is achieved by the Y stepping switch deck 2139. The last contact of the switch deck 2139 is connected to actuate the X stepping switch driver 2141.

Figure 22:
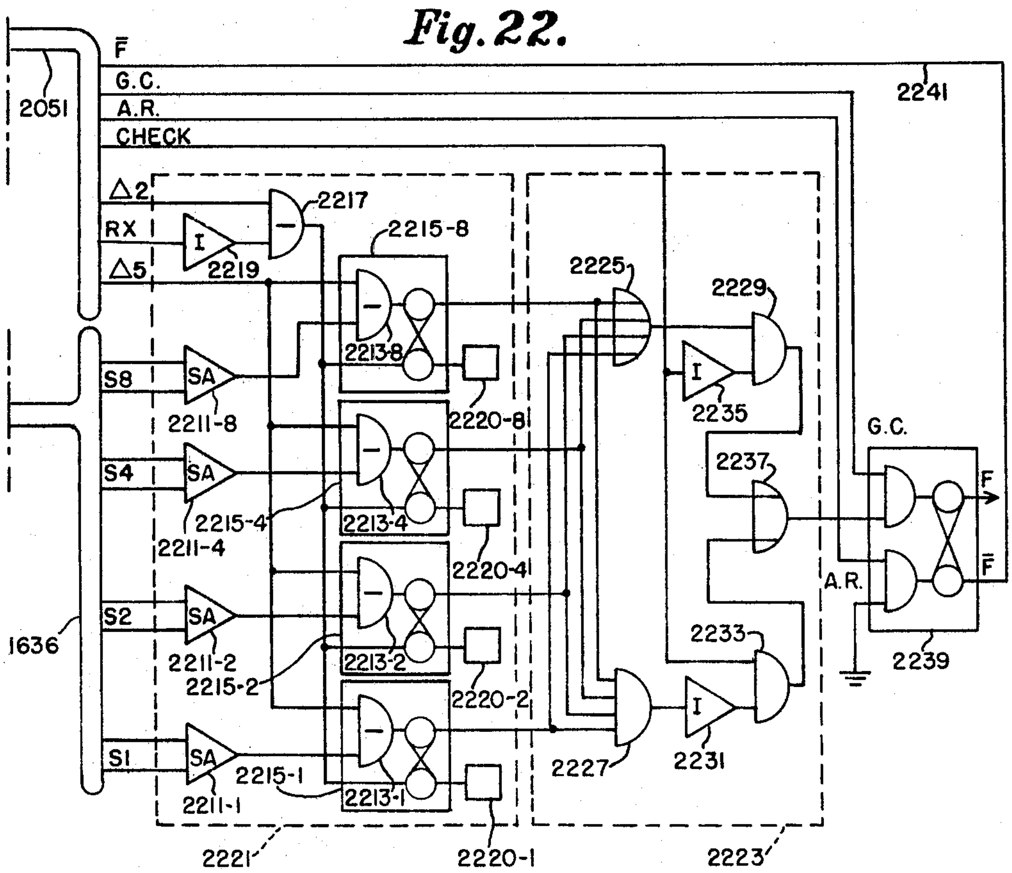
Figure 22A:
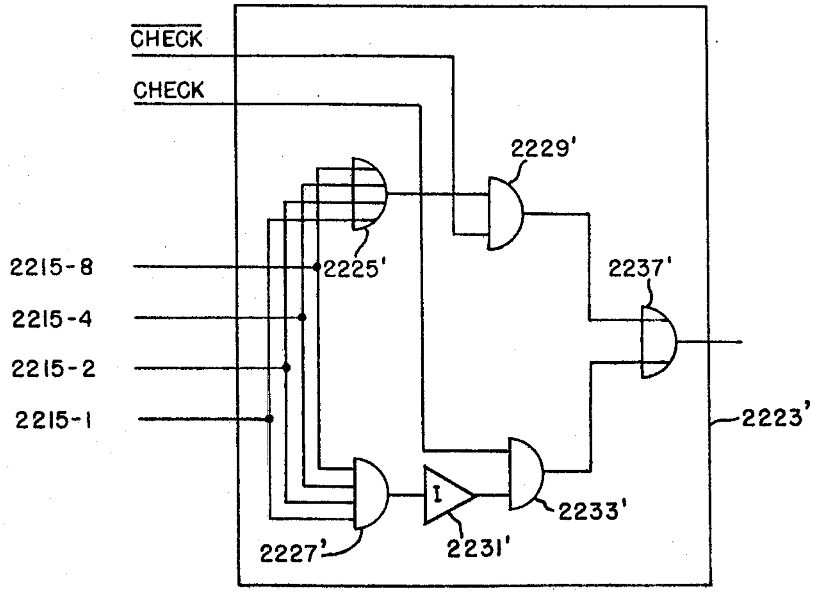

(4) Memory register (FIG. 22)

As mentioned in connection with the description of matrix 1611, each plane of the matrix is threaded with an individual sense line 1631. The sense lines coupling the cores in the 1, 2, 4 and 8 bit planes of the matrix 1611 are labeled on FIG. 16 with the designations $S_1$, $S_2$, $S_4$ and $S_8$ respectively. The pulses which appear on the sense lines 1631 as a result of core switching are applied through harness 1636 to a set of bipolar sense amplifiers 2211, described in my pending application S.N. 270,686, filed Apr. 4, 1963, entitled, Sense Amplifier, now Patent No. 3,305,729, which application is assigned to the assignee of this invention. The output of each sense amplifier 2211 is individually connected to one input of the strobe gate 2213 of a different MRFF unit 2215. The other input of each strobe gate 2213 is enabled by the timing pulse Δ5, fed from the timing system 2313 through line 2328 and through cable 2051. An indicator 2220 is connected to the output of each MRFF.

Sense amplifiers, strobe gates, MRFF units and indicators are given a suffix corresponding to the sense line with which they are associated. Thus the sense line $S_4$ is coupled to the strobe gate 2213–4 of MRFF unit 2215–4 through sense amplifier 2211–4.

The reset input of each MRFF is connected to the output of negative AND gate 2217. The negative AND gate 2217 has two inputs. One is connected to the Δ2 output of the timing system 2313 through line 2326 and harness 2051. The other input to gate 2217 is the logic pulse RX inverted into a negative pulse by inverter 2219. The entire assembly of amplifiers, AND gates, MRFF units and indicators comprises the memory register 2221. The memory register 2221 has eight outputs comprised of the "1" and "0" outputs of the four MRFF units 2215 associated with the sense lines $S_1$, $S_2$, $S_4$ and $S_8$.

It is the function of each MRFF unit 2215 to generate a bi-level wave train in response to the output of a core under test. Each wave train is taken from the "1" output of the MRFF units 2215, all of which are controlled to be low prior to the application of a full READ current to cores under test and to be high during periods following the switching of a normal core by a full READ current only. Various signal voltages are applied to the set and reset terminals of the MRFF units to cause them to assume states in the above prescribed manner, and these signal voltages and their sequence will now be described.

A normal core will generate in its sense winding the wave train voltage pattern 1821 in response to the composite selected memory core current 1811. Initially the MRFF unit will be in a set state as indicated by its output waveform 1839. The first spike *"a"* of waveform 1821 is incomplete, representing the reaction of a normal tested core to a READ current preceded by a disturbed WRITE current only. Immediately preceding the *"a"* spike of waveform 1821 the MRFF unit is reset by MR RESET pulse 1845, which is produced by coincident pulses RX and Δ2. The relative times of occurrence of the *"a"* spike and the resetting of the MRFF unit during a clock period may also be seen in FIG. 25 where it is shown that the MRFF unit is reset by MR RESET pulse 2528 during the 5th micro-second of the clock period whereas the drive current 2521 is not applied to the core until the end of the 8th micro-second of the same clock period. Because of the small size of the *"a"* spike of waveform 1821 the MRFF unit will normally remain in its reset condition.

Full WRITE pulse B is the second pulse of composite selected memory core current 1811 and it causes the tested core to switch from its "0" state into its "1" state and a spike *"b"* to appear in the sense line linking it. This spike is amplified by sense amplifier 2211 and appears as the first negative pulse in the wave train 1841. Because the RX logic wave train 1833 is low during this clock period, the Δ5 pulse 1843 is absent and consequently the sense amplifier output 1839 is not fed through strobe gate 2213 to the set input of the MRFF unit. This effect of the Δ5 pulse is in harmony with the desired operation of the MRFF units which, it will be recalled, is that the MRFF unit is to be set only when a core is switched by a READ current. Since the Δ5 pulse occurs only during clock periods when a ΔR pulse occurs, a sense pulse caused by a WRITE current cannot be gated through to the MRFF units.

The third pulse of the composite selected memory core current 1811 is the full READ pulse C and it causes the tested core to switch from its "1"state to its "0" state and the spike *"c"* to appear on the sense winding as shown on waveform 1821. This spike is amplified by sense amplifier 2211 and appears as the second negative pulse of sense amplifier output waveform 1841. Because the RX logical pulse train 1833 is high during this clock period, a Δ5 strobe pulse 1843 is generated and the second pulse of sense amplifier output waveform 1841 is gated through strobe gate 2213 to set the MRFF unit 2215 during the tenth micro-second of the clock period. Thus, the output of MRFF 2215 goes high in response to the application of a full READ pulse to a normal core.

The fourth pulse of composite selected memory core current 1811 is the full WRITE pulse D. It causes the core to switch from its "0" state back into its "1" state. causing the spike *"d"* to appear on the sense winding of the tested core, as shown on waveform 1821. This spike is also amplified by sense amplifier 2211 and appears as the third negative pulse on wave train 1839. Since during this clock period the RX logical waveform 1833 is again low, the Δ5 pulse is again absent as is shown by wave train 1843. Consequently the amplified output of the tested core is again not gated through to the set input of MRFF unit 2215.

During the next clock period only a half READ current is applied to the core under test. Consequently the normal core will not switch during this clock period. The logic pulse train RX is high. Consequently, with the commencement of timing pulse Δ2 the MR RESET output of negative AND gate 2217 shown as waveform 2528 in FIG. 25, will go low and will reset the MRFF unit 2215. As may be observed from FIG. 25, this will occur just before the read pulse is applied to the core. As mentioned previously, a normal core will not switch under the influence of a half READ current. As shown in FIG. 18 the core sense voltage 1821 should have an insignificant spike in response to such a half READ current. Hence, no output appears at the sense amplifier output and the MRFF unit is not set. During the next six clock periods, the same operation is repeated. During each period a half READ pulse is applied to the core under test. The normal core will not switch during any of these clock periods and the state of the MRFF unit will remain undisturbed. If, however, the core under test should be defective, it may switch as a result of the cumulative effect of several half READ pulses. If this should occur, an output will appear at the sense amplifier output, and since the Δ5 signal is generated during each of these clock periods, the sense amplifier output would be gated through strobe gate 2213 and would cause the MRFF unit to change its state from a reset to a set condition, thereby indicating an unexpected switching of the test core.

Following the seven half READ pulses E, a full READ pulse F is applied to the core under test. A normal core will be switched from its "1" state into its "0" state under the influence of this full READ current, causing a spike to appear on the sense winding linking it, as shown by the spike *"f"* on the waveform 1821. As during all other clock pulses, when a READ pulse is applied to a core, the logic pulse train RX will be high. Consequently, a Δ5 signal will be generated and the *"f"* spike will, after amplification by sense amplifier 2211, be fed through strobe gate 2213 to set the MRFF 2215. This is shown by the last step of the waveform 1839.

From the above description it may be seen that bi-level waveform representing the state of the MRFF flip-flop 2215 will have a well defined and unchanging configuration when the core under test has no defects. If a core does not switch when it should, the MRFF "1" output will be low when it should be high. If the core under test switches when it should not, the MRFF output will be high when it should be low. Thus the output of an MRFF unit is a reliable indication of the presence or absence of a defect in a core under test.

(5) Comparator (FIG. 22)

The comparator unit 2223 includes at its input an OR gate 2225 and an AND gate 2227. All four MRFF outputs that are to be monitored are fed to the four inputs of the OR gate 2225 and the AND gate 2227. The output of OR gate 2225 is fed directly to one input of AND gate 2229. The output of AND gate 2227 is fed through inverter 2231 to one input of AND gate 2233. The other input of AND gate 2233 is the CHECK pulse output of pulse generator 1912, fed through harness 1937, through line 2053 and through harness 2051. The same CHECK pulse output is also fed to the other input of AND gate 2229 but only after being inverted by the inverter 2235. The outputs of the AND gates 2229 and 2233 are fed to OR gate 2237 whose output forms the output of the comparator system 2223.

It is the function of the comparator to monitor the wave trains on the four input lines and to compare these four, normally identical, wave trains with the CHECK pulse train. The task of comparing the input waveforms with the CHECK pulse train is divided into two parts. It will be recalled that the normal output of the MRFF units will be the waveform 1839 of FIG. 18. It has been pointed out that the waveform 1839 comprises high levels alternating with low levels. The task of ascertaining the conformance of the high portions of the MRFF output waveform with the CHECK pulse train is performed by the AND gate 2227 in combination with the inverter 2231 an dthe AND gate 2233. Put another way, these components ascertain that the MRFF output waveforms are high when they should be high. The AND gate 2227 will have a high level at its output when all four of its inputs are at a high level. Under these conditions, the outputs of the inverter 2231 will be low, i.e., when all four MRFF units are high, the AND gate 2227 will produce a high output and this will be inverted by 2231 to a low level, fed to one input of AND gate 2233. The other input of AND gate 2233 receives the CHECK pulse train from the pulse train generator 1912. The CHECK pulse train will be high and since the inverter output is low, the output of AND gate 2233 will not be high. If, however, any one of the MRFF units should have a low output, i.e., an output different from the CHECK pulse train level, the AND gate 2227 will be low, the inverter output 2231 will be high and the AND gate 2233 will be enabled to produce a high output. This high level will be fed through OR gate 2237 to energize the set input of alarm flip-flop 2239.

The low level portions of the MRFF unit output waveforms are checked by the OR gate 2225, inverter 2235, and AND gate 2229. Assume that at a given instant the CHECK pulse train is at a low level. This means that the outputs of all four MRFF units should also be at a low level. The CHECK pulse train is fed to the AND gate 2229 after being inverted by the inverter 2235 so that, when the CHECK pulse train is low, the AND gate 2229 will receive a high level input on the inverter 2235. The other input to AND gate 2229 is received from the OR gate 2225. It may be seen that, if the AND gate 2229 is to remain unenergized, i.e., if it is not to have an output, the output of OR gate 2225 must be low. This will be the case only if none of the four inputs to OR gate 2225 are high, i.e., if all four MRFF units are low at their outputs. If any of the MRFF units are high, the OR gate 2225 will be high, and the AND gate 2229 will receive a high level input at both of its input terminals in which case the output of AND gate 2229 will be high and this high level will be fed through OR gate 2237 to the set input of alarm flip-flop 2239.

Thus, the output waveform produced by all four MRFF units 2215 are continuously monitored. If any MRFF unit produces a high level output when it should be producing a low level output, an alarm signal will be generated through the action of OR gate 2225, inverter 2235 and AND gate 2229. Similarly, if any MRFF unit produces a low level output when it should be producing a high level output, an alarm signal will be generated through the action of AND gate 2227, inverter 2231 and AND gate 2233. By using an AND gate 2227 and OR gate 2225 having a larger number of input terminals than four the comparator 2223 can be modified to compare a larger number of MRFF outputs than the four used in the system described above. This would be necessitated if it were desired to test a magnetic core matrix stack having more than four memory planes.

FIGURE 22(*a*) illustrates a slight modification of the comparator 2223 shown in FIGURE 22. The only difference between the comparator 2223' of FIGURE 22(*a*) and comparator 2223 of FIGURE 22 is that in the modified comparator of FIGURE 22(*a*), instead of generating the inverse of the CHECK pulse train by inverting it through inverter 2235, the inverter is omitted and the inverse of the CHECK pulse train is generated by the optional logic circuit shown in FIGURE 19(*a*) whose output is fed directly to an input of AND gate 2229.

The modified comparator 2223' will be used in those instances where for some reason it is desirable to generate the inverse of the CHECK pulse train independently from the means which generates the CHECK pulse train itself. Where this is desirable, the logic circuit 1938 acts as the functional equivalent of the omitted inverter 2235, in that both of them act as means for generating the inverse of the expected output of each of the memory register flip-flops.

(6) Alarm Flip Flop (FIG. 22)

The alarm flip-flop 2239 is of the type described in connection with FIG. 11. An alarm reset signal designated as A.R. is fed to the reset input of alarm flip-flop 2239 to reset it. The A.R. signal is produced by means to be described subsequently. The set clock input of alarm flip-flop 2239 is energized by the gated clock signal G.C. fed from the clock system 2311 through lead 2312 and through harness 2051. The zero output of alarm flip-flop 2239, labeled $\overline{F}$, is utilized as the output of the alarm flip-flop and is fed to other portions of the system through line 2241 and harness 2051.

The clock system 2311 also includes a slow clock 2333 for stepping the Y stepping switch driver 2143. The slow clock 2333 may be a multivibrator of the same type used in clock 2315 but will have a period which is much longer, typically of the order of 60 milliseconds.

The portions of the system described above are those which are required to generate a pulse train for testing cores in a matrix and circuitry for evaluating the cores by comparing their output in response to the test pulse train with a CHECK pulse train. There has also been described stepping switch means for causing the test pulse train to be applied to cores of the matrix in sequence. The control circuitry for stepping the switches and for controlling the state in which a core shall be left after testing is shown in FIG. 23 but will not be described at this point. Instead the operation of the system comprising the parts heretofore described will now be discussed in connection with FIG. 24.

H. SYSTEM OPERATION (FIG. 24)

Figure 24:
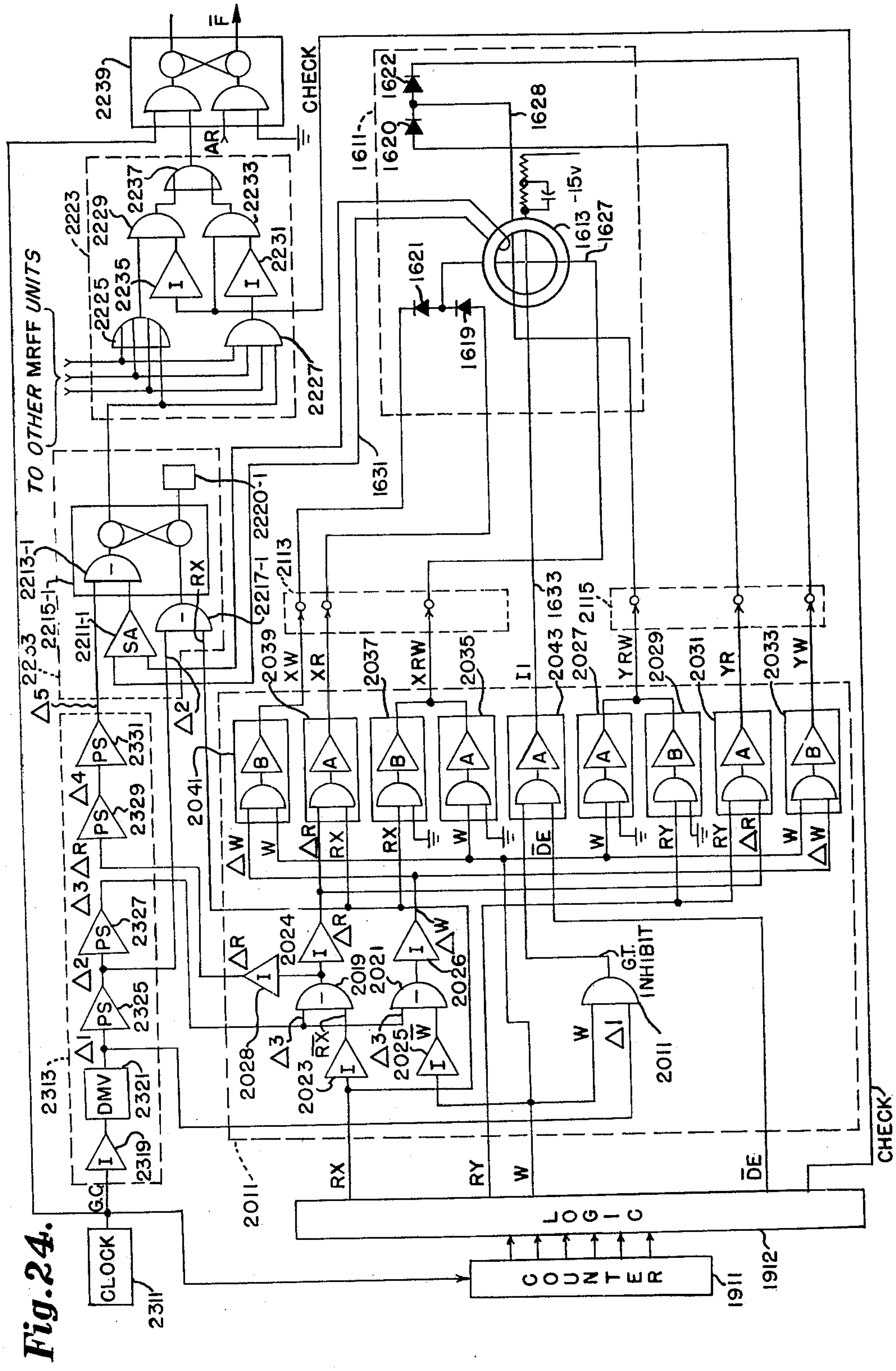
FIG. 24 is a simplified circuit diagram showing portions of the system with a single core under test.

FIG. 24 is a composite diagram showing parts of the system which are necessary to check a single core. The reference numerals employed with the different components shown in FIG. 24 correspond to the numerals employed with those components in the previous diagrams showing those components in more detail.

Counter 1911 is stepped by the gated clock pulse output of clock 2311 and generates a series of symmetrical pulse trains which are fed to the logic circuit 1912. The logic circuit 1912 combines the outputs of counter 1911 to generate a series of asymmetrical pulse trains labeled RX, RY, W, $\overline{DE}$, and CHECK. The logic pulse train RX is inverted by inverter 2023 and is gated through negative AND gate 2019 by the Δ3 timing pulse. The gated and inverted RX pulse is reinverted by inverter 2024 into the pulse ΔR which is then fed to the various memory drivers of the mixer 2011. The outputs of the drivers are fed through contacts of the switches 2113 and 2111 to the test core 1613. The core sense winding output, which in this simplified drawing is the output of the "1" bit memory plane, is fed to sense amplifier 2211-1 whose output is gated through strobe gate 2213-1 by the timing pulse Δ5. The output of strobe gate 2213-1 sets MRFF 2215-1. The MRFF unit is reset by the RX logic pulse gated through AND gate 2217-1 by timing pulse Δ2. Resetting of the MRFF unit, timed by Δ2 occurs shortly before setting, timed by Δ5, and both occur only during those clock periods in which a READ pulse is applied to the core. The output of MRFF 2215 indicates the reaction of the core under test to READ pulses, and is compared in comparator 2223 with the CHECK pulse train output of logic system 1912. The output of comparator 2223 is fed to alarm flip-flop 2239.

The W pulse train output of logic system 1912 is inverted by inverter 2025 and then gated through negative AND gate 2021 by the timing pulse Δ3. The inverted and gated W pulse train is re-inverted by inverter 2026 and is labeled ΔW. The ΔW or gated signal is fed to the various memory drivers for driving WRITE currents through the windings of the core under test. The W logic pulse train also serves as the control for driving INHIBIT currents through the INHIBIT winding of the core under test. The W logic pulse train is gated through AND gate 2015 by the timing pulse Δ1 to form the G.T. INHIBIT signal. The G.T. INHIBIT signal gates the $\overline{DE}$ logic signal through the AND gate of INHIBIT driver 2043 for driving INHIBIT current through the INHIBIT winding of core 1613 under test.

Upon looking at FIGURE 18 it will be recalled that during the first clock period the logic pulse trains RX and RY are high. Consequently, with the occurrence of timing pulse Δ3 the RX signal is inverted, gated through negative AND gate 2019 during a part of the clock period, is then re-inverted to form the ΔR pulse, which is fed to MDA units 2031 and 2039. Additionally, the logic pulse RY appears for the entire first clock period at the inputs of drivers 2029 and 2031, and the logic pulse train RX appears for the entire first clock period at the inputs of MDA unit 2039 and the MDB unit 2037. Under the influence of the ΔR, RX and RY signals various currents are driven through the drive lines of core 1613. A half READ current is sent from MDA 2039 through switch 2113, diode 1619, X drive line 1627, and switch 2113 to MDB 2037. A half READ current is also sent through Y drive line 1628 by MDA 2031 and MDB 2029, the path of current being from MDA 2031, switch 2111, diode 1620, line 1628, and back through switch 2111 into MDB 2029.

As a result of the coincident application of half READ currents to the X and Y drive lines 1627 and 1628 the composite selected memory core current during a portion of the first clock period is a full READ pulse as shown by the wave train 1811 of FIGURE 18. Normally the core under test will be in the "0" state as the first clock period begins. Consequently, application of the full READ pulse will not reverse the core, and hence only a small spike will appear at its sense winding. This is represented by the spike "*a*" on curve 1821. This spike is amplified and gated to the set input of MRFF unit 2215–1, which will have been reset by logic pulse RX gated by Δ2 just before the occurrence of the core READ current, gated by Δ3. With a normal core the first full READ current will not cause the MRFF unit 2215–1 to be set.

During the next clock period the logic pulse train W will be high. This pulse is inverted by inverter 2025, and is gated through negative AND gate 2021 of the mixer 2011 by timing pulse Δ3. The gated output of AND gate 2021 is then inverted by inverter 2026 to produce the pulse ΔW. ΔW is fed to the AND gates MDB 2041 and MDB 2033. The logic pulse W is also fed to the AND gates of MDB 2041, MDA 2035, MDA 2027, and MDB 2033.

During this clock period half WRITE pulses will be fed through both the X drive line 1627 and the Y drive line 1628 in the following manner. A half WRITE current is sent from MDA 2035 through switch 2113, drive line 1627, diode 1621, and back through switch 2113 into MDB 2041. A half WRITE current is also sent from MDA 2027, through switch 2111, drive line 1628, diode 1622, and back through switch 2111 to MDB 2033.

As a result of the coincidental application of a half WRITE current to the X and Y drive lines of the core the composite selected memory core current during the second clock period will be a full WRITE current shown on the waveform 1811 as the pulse B. The full WRITE current will reverse the core, and will cause pulse "*b*" to appear on the sense winding 1631 of the core. It will be recalled that the Δ5 timing pulse is generated only during those periods in which a READ pulse is generated, because only during those periods is it desired to permit setting of the MRFF unit. Therefore, the pulse "*b*" appearing on sense winding 1631 will be amplified by the sense amplifier 2211–1 but will not be gated through strobe AND gate 2213–1 because of the absence of timing pulse Δ5 during the second clock period. Consequently, the MRFF unit during this period will not be set.

During the third clock period the same currents will be applied to the core 1613 as were applied during the first clock period. Unlike the first clock period, however, during the third clock period the application of a full READ current will cause reversal of the core from its "1" state to its "0" state, resulting in the appearance of a full size spike on the output winding 1631 of the core as shown by spike "*c*" of waveform 1821. This full spike "*c*" is amplified by sense amplifier 2211–1 and is gated through strobe gate 2213–1 by the timing pulse Δ5 which is generated during this third clock period. Consequently, during this third clock period of the MRFF unit is set as a result of the reversal of the core in response to a full READ pulse.

During the fourth clock period the same currents are applied to the core as were applied during the second clock period, and the core under test will be returned from its "0" state to its "1" state by coincidental application of half WRITE currents to its X and Y drive lines. With both the MR reset and Δ5 timing pulses absent during this clock period the MRFF unit will remain undisturbed in its set condition.

During the next seven clock periods, only the RX logic pulse train is generated. Consequently, during these seven clock periods no WRITE current is sent through the core winding and a half READ current is sent through the X drive line only, the current path being from MDA 2039, through switch 2113, diode 1619, X drive line 1627, back through switch 2113 into MDB 2037. As explained previously, the half READ current pulses will be insufficient to reverse the state of the core under test from "1" to "0" if the core is normal. Consequently, no full size spikes appear on the sense winding 1631 of the core 1613 and no pulses appear at the set input of the MRFF unit 2215–1 so that the MRFF unit 2215–1 which is reset during each of the seven clock periods by the RX logic pulse gated by timing pulse Δ2 will remain reset.

During the clock period following the last of the aforementioned seven the logic pulse trains RX and RY are both high so that in the manner described previously a full READ current is generated. This causes the spike "*f*" to appear on the sense winding 1631 of the core under test which is amplified by the sense amplifier 2211–1 and is gated through strobe gate 2213–1 by timing pulse Δ5, and will set the MRFF unit 2215–1.

During the next eight clock periods, a full WRITE current is applied to the core under test in combination with an INHIBIT current. These currents are applied in the following manner. During each of the clock periods when a mixed full WRITE and INHIBIT current is to be applied to the core under test the W logic pulse train is high and causes a half WRITE current to be driven through the X and Y drive lines of the core 1613 in the manner described in connection with the second and fourth clock periods. Additionally, during the central portion of each of the last eight clock periods an INHIBIT current will be sent through the inhibit winding 1633 from INHIBIT driver 2043 through INHIBIT line 1633. INHBT driver 2043 is actuated by the logic pulse $\overline{\text{DE}}$, which exists for the entire duration of the eight clock periods and by the G.T. INHIBIT pulse which exists during the central portion of those clock periods during which WRITE pulses are produced. Superposition of the INHIBIT pulse upon the full WRITE pulse during each clock period prevents the reversal of the core from its "0" state into its "1" state. Consequently, during the eight clock periods, no sense voltage is generated in the sense winding of the core under test as may be observed on the waveform 1821 of FIGURE 18.

The sequence of pulses just described is repeated several times for each core. Thus, the last of the eight mixed INHIBIT and full WRITE pulses is followed by the first pulse in the next composite wavetrain. This is the pulse A of waveform 1811 which is a full READ pulse. During the first clock period the MRFF unit 2215–1 is reset by the logic signal RX gated by timing pulse Δ2. If the core under test is a normal one so that it was not reversed from its "0" state into its "1" state by the series of INHIBIT and full WRITE signals, the core state will not be reversed by the READ signal A and consequently, a signal will not be produced in its sense winding, and the MRFF 2215–1 unit will remain reset. If on the other hand, the core was defective and the INHIBIT current through its inhibit winding did not prevent the core from being reversed into its "1" state by the full WRITE currents then the first pulse of the next composite wave train will cause another core reversal from the "1" state into the "0" state, and this in turn will cause the MRFF unit 2215–1 to be set.

The output of MRFF 2215–1 is compared in comparator 2223 with a special CHECK pulse train generated by logic system 1912. The CHECK pulse train has the same high and low portions as the output of MRFF 2215–1 when stepped in response to a satisfactory core under test. If there is any disparity between the MRFF output and the CHECK pulse train, that is, if the MRFF unit is set when it should be reset or is reset when it should be set, an output will be fed from comparator 2223 to ALARM flip flop 2239 and an alarm indication will be given immediately.

FIGURE 24 is a simplified diagram of the tester circuit and shows only those parts of the tester which are required to test a single core. It will be recalled, however, that the system is designed to check a stack of core planes by simultaneously testing cores in the several planes located at the same X–Y address. Thus in any position of the memory tester several cores, each in a different plane but at the same memory address, may be tested simultaneously by currents driven through DRIVE and INHIBIT lines linking all of such cores. The sense windings of these simultaneously tested cores are individual to cores in the different memory planes and are associated with individual MRFF units 2215. All of the MRFF units however have their outputs connected to a common comparator 2223. This unit is shown in the simplified Diagram 24 but only one MRFF unit, that associated with the "1" bit level, is shown, with its output being connected to one input of the comparator 2223. The other MRFF units are indicated by their output lines, shown connected to other inputs of the comparator. As will be recalled from an earlier description of the comparator, the outputs of each of these MRFF units will be compared with the CHECK pulse train, and if there is a disparity between the output of any of these MRFF units and the CHECK pulse train an alarm indication will be generated from the ALARM flip flop 2239.

I. STEPPING SWITCH CONTROL CIRCUIT (FIG. 23)

The stepping switch control circuit includes the slow clock 2333, inverter 2335, and the AND gate 2337, all within the clock system 2311. The output of the slow clock 2333, SC, is inverted by the inverter 2335 and the inverted slow clock output $\overline{SC}$ is fed to one input terminal of AND gate 2337. The other input of the AND gate 2337 is the $\overline{F}$ output of the alarm flip flop 2239. Thus, so long as there is no indication of error from the alarm flip flop 2239, the output of AND gate 2337 will be up during each down period of the slow clock 2333 output. Since the output $\overline{F}\ \overline{SC}$ of AND gate 2337 serves to energize the Y stepping switch driver 2143, to which it is connected through line 2339 and harness 2051, the Y stepping switch is caused to step each time the slow clock output SC is down, that is, with each cycle of the slow clock 2333, unless there is an alarm signal.

J. POSITION INDICATOR CIRCUIT (FIG. 27)

As described in the previous section, the core tester will automatically step from core to core so long as cores are found normal. As soon as a core fails a test, however, the $\overline{F}$ output of flip flop 2239 goes low. This disables AND gate 2337 and causes the Y stepping switch driver 2143 to be de-energized and the stepping sequence to stop.

Figure 27:
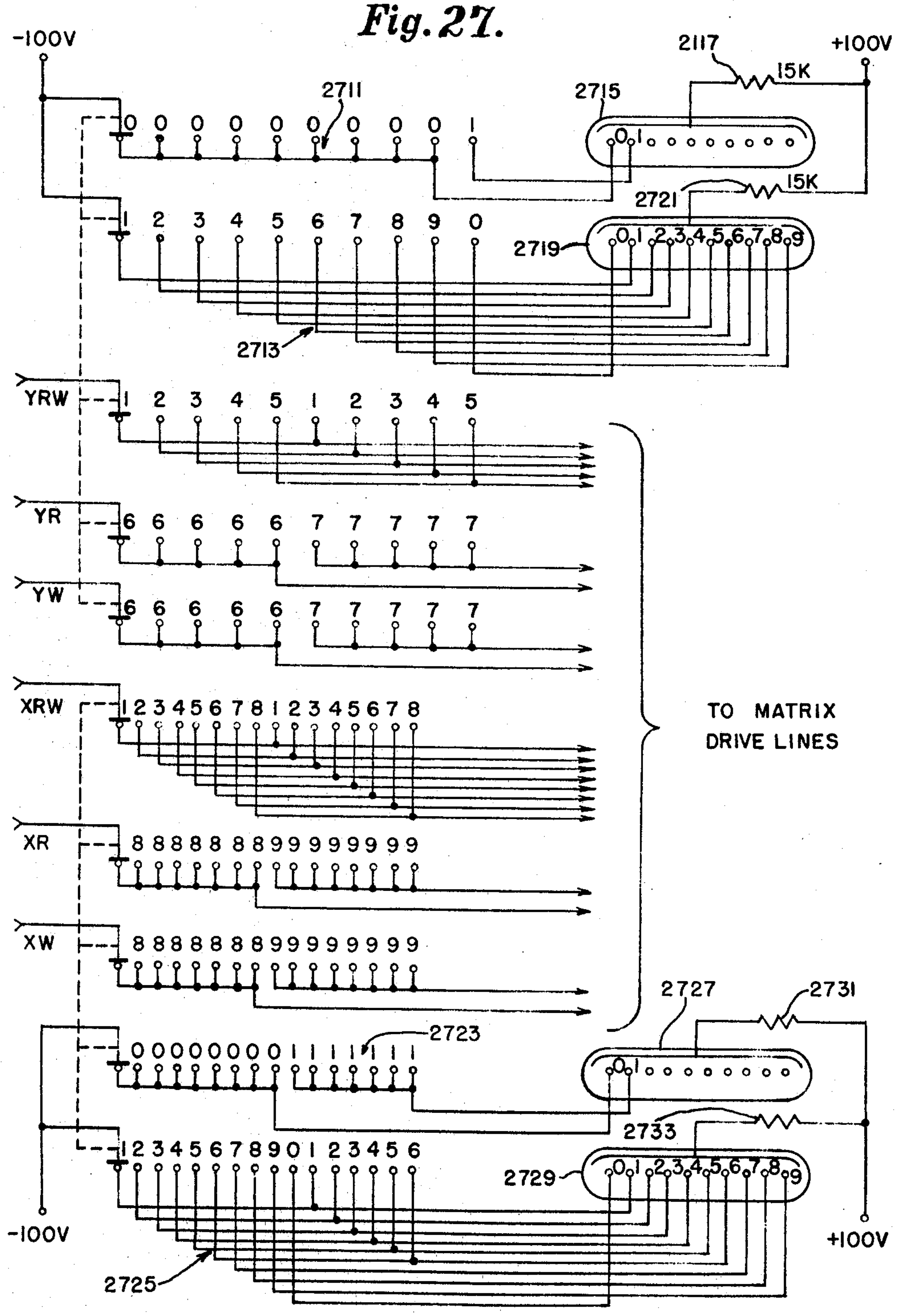
FIG. 27 is a circuit diagram of a position indicator for the system.

To determine which of the many cores in the matrix tested was the defective one, it is necessary to determine the position at which the X and Y stepping switches 2113 and 2111 stopped. To this end, there may be provided an indicating circuit of the type shown in FIGURE 27. FIGURE 27 shows in addition to the basic decks of the stepping switches of FIGURE 21, two additional Y switch decks 2711 and 2713, and two additional X switch decks 2723 and 2725. Each of the adidtional X and Y switch decks has as many contacts as the original switch decks of its respective switch. Thus Y switch decks 2711 and 2713 each has 10 contacts, whereas X switch decks 2723 and 2724 each has 16 contacts.

The first nine contacts of switch deck 2711 are labeled "0," and are connected to each other and to the first cathode of a numerical indicating tube 2715. The anode of the indicating tube 2715 is typically connected to a +100 volt source through resistor 2717. The tenth contact of switch deck 2711 is labeled "1," and is connected to the second cathode of indicator tube 2715. The wiper of Y switch deck 2711 is typically connected to a −100 volt source. Switch deck 2711 and its associated indicating tube 2715 serve to provide the first digit of a two digit number representing the position of the Y stepping switch.

The unit digit of the number representing the position of the Y stepping switch is provided by switch deck 2713 each of whose contacts is connected to a different one of the 10 cathodes of numerical indicating tube 2719. The anode of indicator 2719 is connected to a +100 volt source through resistor 2721, while the wiper of switch deck 2713 is connected to a −100 volt source.

The tens and the units digit of the two digit number representing the position of the X stepping switch are provided by the X switch deck 2723 and 2725 respectively. The first 9 contacts of switch deck 2723 are connected to the first cathode of indicator tube 2727. The tenth contact and the contacts following it are connected to the second cathode of indicator tube 2727.

Contacts of the switch deck 2725, numbered in two series, from "1" through "9" and "0," and from "1" to "6" respectively, are connected to correspondingly numbered cathodes of numerical indicator tube 2729. As was the case with the numerical indicator tubes connected to the Y stepping switch, the indicator tubes 2727 and 2729 have an anode which is connected to +100 volts through resistors 2731 and 2733 respectively. The wipers of switch deck 2723 and 2725 are each connected to a voltage source of −100 volts.

As the wipers of stepping switches X and Y step along their contacts, all wipers of each switch stepping are in register and the positions of these wipers will be indicated at all times by the indicating tubes 2715, 2719, 2727 and 2729. Since the positions of the X and the Y stepping switch wipers correspond to the X and Y drive lines being energized, the switch positions indicated by the indicating lamps indicate the X and Y drive lines being energized at the time. Therefore, if the stepping switches are stopped, due to interruption of the system by a faulty core, the X and Y address of that core may be ascertained by observing the numbers displayed by the indicator tubes.

Since in the typical situation there are four cores at each XY address, it remains to be determined which one of these four cores being tested simultaneously was the defective core which caused the tester to stop. It is for this purpose that the indicating unit 2220 is provided at the "0" output of each MRFF unit as described in connection with FIGURE 13. These neon lamp type indicators provide a constant display of the state of their associated MRFF units. In most cases, only one core will be defective in any given position so that, that core may be readily found by observing which one of the four indicators 2220 differs in its display from the other three indicators. A more certain method of ascertaining the identity of the defective core is to observe the output of each of the four cores with an oscilloscope type of measuring device and to observe simultaneously the applied drive currents.

K. MEMORY PULSE TEST PATTERN SELECTOR (FIG. 23)

The memory test pattern selector 2341 is provided to permit selection of the pulse test pattern that will be applied to individual cores under test. With one setting of the pattern selector all cores will be left in the "0" state after completion of the test. With another setting of the pattern selector, all cores may be left in the "1" state after testing. Finally, with a third setting of the pattern selector, alternate cores in the matrix under test may be left in opposite states of magnetization. This switching arrangement may be modified to leave any combination of "1's" and "0's" in the cores after they have been tested.

The memory test pattern selector 2341 includes a gate control flip-flop 2343, labeled FFG. The "1" output of the FFG 2343 forms the output of the memory test pattern selector system and is connected to the enabling input terminal of AND gate 2317 whose other input terminal is connected to the output (CL) of clock 2315. As explained earlier, the output of AND gate 2317 is the gated clock pulse (GC), which serves to step the binary counter 1911. The binary counter 1911 in turn feeds several pulse trains to the logic system 1912 which then converts the several input pulse trains into a series of logic pulse trains. Some of the logic pulse trains, after gating by timing pulses from timing system 2313, serve to form the memory test pattern. FFG 2343 operates to determine the state in which a core is to be left after testing by ceasing to enable transmission of clock pulses through the clock AND gate 2317, thereby interrupting the generation of the gated clock (GC) pulses.

In a manner to be described immediately hereinafter, interruption of the generation of (GC) pulses stops the binary counter 1911, which in turn results in the termination of the test pattern fed to the core under test. By selecting the clock period during which this shall occur, the state in which a core shall be left after testing may be predetermined.

FFG 2343 is set by the output of AND gate 2345, which has two input terminals. One input of AND gate 2345 is connected to the output of clock 2315 and the other input is connected to the output of inverter 2335. Since the output of AND gate 2345 is high only when the clock pulse and the inverse of the slow clock output ($\overline{SC}$) are high at the same time, FFG 2343 will be set by each clock pulse while the slow clock output is down. Since the "1" output of FFG 2343 is high when the flip-flop "1" is set, FFG 2343 will, while it is in the set state enable the clock AND gate 2317 to pass the output of the clock 2315 and thus to produce the GC signal which steps the binary counter 1911. FFG 2343 also generates an ALARM RESET (A.R.) signal for resetting alarm 2239.

The remaining components of the memory pattern selector 2341 serve to reset FFG 2343 so as to discontinue generation of the gated clock pulse train at the appropriate instant. These components include the complementing WRITE-READ flip-flop 2347 (WRFF), AND gates 2349 and 2351, the OR gate 2353, and inverter 2355.

AND gate 2349 has four input terminals. The input to the first input terminal of AND gate 2349 is the slow clock pulse SC derived from the inverter 2355, whose input is connected to the output of inverter 2335 so that the slow clock pulse SC is derived by a double inversion of the output of the slow clock 2333. The input to the second input terminal of AND gate 2349 is the logic pulse train of $AC\overline{D}\ \overline{E}$ derived from the logic system 1912. The input to the third input terminal of AND gate 2349 is the logic pulse $\overline{B}$, derived from binary counter 1911. It should be noted that although the points in the binary counter 1911 and logic system 1912 from which logic pulses $\overline{B}$ and $AC\overline{D}\ \overline{E}$ are derived may be physically separate, functionally they are merely a tap means in the pulse train generating system 1910 which is energized during the sixth clock pulse period. Finally, the input to the fourth input terminal of AND gate 2349 is the "0" output of WRFF 2347 and is thus labeled $\overline{WR}$ as shown on FIGURE 23.

The output of AND gate 2349 may be represented by the logical symbol of $A\overline{B}C\overline{D}\ \overline{E}\ SC\ \overline{WR}$. The logic symbol $A\overline{B}C\overline{D}\ \overline{E}$ occurs only during the sixth clock period. Thus the output of AND gate 2349 will be high during the sixth clock period of the first memory test pattern following the change of the slow clock output from low to high if the WRFF 2347 is in the reset state.

The AND gate 2351 has three inputs. The first input is the slow clock pulse SC received from the slow clock 2343 after a double inversion by the inverter 2335 and the inverter 2355. The second input to the AND gate 2351 is the logic function $\overline{A}BC\overline{D}\ \overline{E}$ received from the logic system 1912. The point in the logic system whence $\overline{A}BC\overline{D}\ \overline{E}$ is derived serves as another tap means which is energized during the fifth clock period.

The third input to the AND gate 2351 is the WR output of the flip-flop 2347 representing the "1" output of that flip-flop. Observation of FIGURE 18 will show that the logic function $\overline{A}BC\overline{D}\ \overline{E}$ occurs only during the fifth clock period. Thus the output of AND gate 2351 will be high during the fifth clock period of the first memory test pattern following the change of the slow clock output from low to high if the WRFF 2347 is in the set state. The output of AND gate 2349 is fed to one input of OR gate 2353. The output of AND gate 2351 is connected to the other input of OR gate 2353. The output of OR gate 2353 is connected to the reset input of FFG 2243.

The WR flip-flop 2347 may be operated in three modes. In one mode the flip-flop operates as a complementing flip-flop and its state is reversed with each application to its input of the pulse $\overline{SC}$ derived from the inverter 2335. In the second mode of operation a negative voltage source of −4 volts is connected through single pole double throw switch 2357 to the reset gate output of WRFF 2347. This renders the flip-flop incapable of being reset so that it will remain in the set state. In the third mode of operation the −4 volt source is connected through switch 2357 to the set gate output of the flip-flop with the effect that the flip-flop will be incapable of being set and as a consequence the flip-flop will remain in its reset condition.

Figure 26:
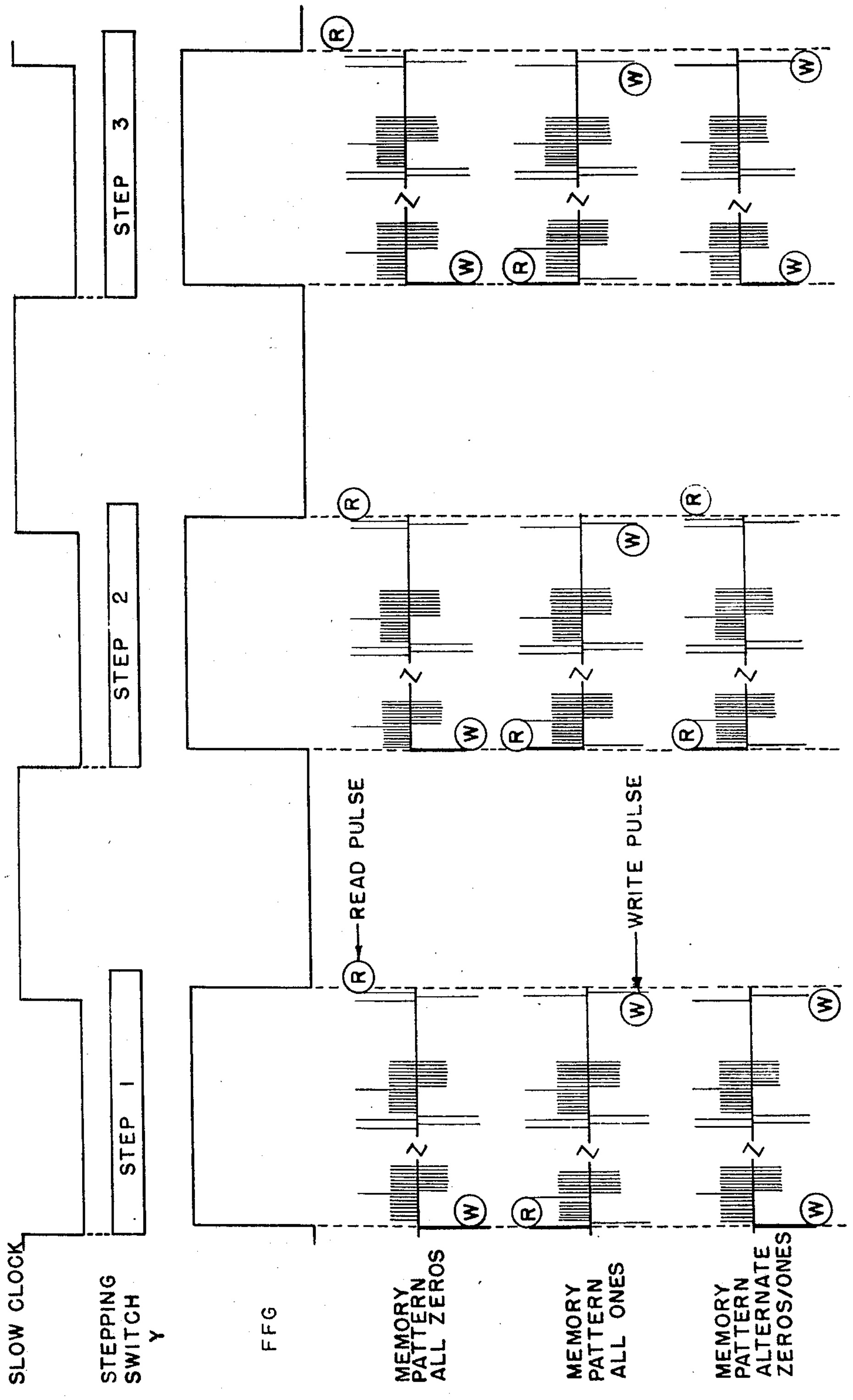
FIG. 26 is a timing diagram of signals in the pulse pattern control system.

Operation of the test pattern selector will be first described with the WR flip-flop in its third mode of operation, i.e., with −4 volts being applied to its set gate output. As shown in FIGURE 26 with the slow clock pulse going negative, FFG 2243 is set and its "1" output goes high. This enables the clock AND gate 2317 and memory test pattern pulses are generated. Because the period of the slow clock 2333 is much longer than the period of the clock 2315, several complete memory test patterns will be generated before the end of the down period of the slow clock output. When the slow clock output SC goes up, gating of clock pulses through AND gate 2345 to the set input of FFG 2243 ceases and the flip-flop is then ready to be reset by the output of OR gate 2353. Also as a result of the up condition of the slow clock output SC the AND gates 2349 and 2351 are conditionally enabled.

With the switch 2357 in the "0" position the WR flip-flop remains in its reset position so that the $\overline{WR}$ output of the flip-flop is fed to the AND gate 2349 and the "1" or WR output of WRFF 2347 does not appear at the input AND gate 2351. Consequently the AND gate 2351 is disabled while the AND gate 2349 is still conditionally enabled and will produce an output during the sixth clock period following the commencement of the positive portion of the slow clock output. This output pulse from the AND gate 2349 is coupled through the OR gate 2353 and operates to reset FFG 2343 during the sixth clock period following the commencement of the positive portion of the slow clock output. From FIGURE 18 it may be seen that during the sixth clock period the composite selected memory core current 1811 is a full READ pulse. Since it is during this sixth clock period that the flip-flop 2343 is reset so as to disable the clock AND gate 2317, the last test pulse to be applied to a core will be a READ pulse.

Thus after the slow clock output has gone positive, FFG 2343 will remain set until the sixth clock period following. During the sixth clock period, that is, during the clock period when the second READ pulse of a given memory test pattern occurs, FFG 2243 is reset and consequently its "1" output goes down as shown in FIGURE 26.

Some time atfer the slow clock pulse has gone positive it will go negative again and at that time the stepping switch will cause the test pulse pattern to be applied to another core in the matrix under test. With the slow clock output negative, FFG 2343 will be set during the first clock period following the commencement of the negative going portion of slow clock pulse train. Since no clock pulses were applied to the binary counter 1911 between the last clock period of the previous test pulse train and the first period of the new pulse train, the pulse test train applied to the second core under test will commence with the seventh clock period of the normal pulse sequence or with the second WRITE current pulse of the composite selected memory core current. The same events that took place in the testing of the first core will then again take place and after the application of several trains of the composite selected memory core current 1811 the core under test will again be left in its "0" state by terminating the last memory core current pulse train at the sixth clock period and second READ pulse thereof. In this mode of operation then, the initial pulse applied to each core under test is a full WRITE pulse and the last pulse applied to each core is a full READ pulse as shown in FIGURE 26, under the heading "Memory Pattern All Zeros."

The second mode of operating the memory core tester is that in which all cores are left in their "1" state after they have been tested. In other words the last test pulse applied to each core must be a full WRITE pulse. In this mode of operation the switch 2357 is set in its "1" position connecting the −4 volt source to the reset gate output of WR flip-flop 2347. As a result the WR flip-flop remains in its set state, and its "1" output is high, conditionally enabling AND gate 2351 by applying a high voltage level to its first input terminal.

Several complete memory test patterns will be applied to a core under test during the DOWN portion of the slow clock output, in the same manner as described in connection with the first mode of operation. When the slow clock output goes high the second input terminal of AND gate 2351 will be high. During the fifth clock period following, the third and last input terminal of AND gate 2351 is driven high by the logic signal $\overline{A}\overline{B}C\overline{D}\ \overline{E}$, and through OR gate 2353 resets FFG 2343. Since the memory pattern during the fifth clock pulse is a full WRITE pulse, the output of 2351 will occur during the WRITE pulse, and will reset the flip-flop 2243 after the WRITE pulse has been applied to the core under test. Consequently the WRITE pulse generated during the fifth clock period will be the last pulse to be applied to the core under test, since after the fifth clock period the reset flip-flop 2243 will not enable the AND gate 2317 to transmit gated clock pulses to the binary counter 1911.

When the slow clock goes negative again, the stepping switch is caused to step into a second position so as to apply the memory core test pattern to the second core in the matrix to be tested. With the slow clock down, the first clock pulse will set the flip-flop 2343 through AND gate 2345 and the resulting "1" output of FFG 2343 will enable this first clock pulse to be gated through the clock AND gate 2317 to binary counter 1911. Since the setting of the binary counter 1911 remained undisturbed since testing of the first core, the counter will be stepped from its fifth clock position in which it was left during the testing of the previous core into its sixth clock position which represents the second full READ pulse in the memory test pattern.

Thus, in this second mode of operation the core test pattern begins with a full READ pulse and ends with a full WRITE pulse so that all cores are left in the "1" state after testing. This is shown in FIG. 26 under the heading "Memory Pattern All Ones."

In the third mode of operating the tester, the switch 2357 is not connected to either of the WRFF gate output terminals. Consequently, the WRFF unit 2347 acts as a complementing flip-flop and upon receipt of successive inverted slow clock pulses $\overline{SC}$ at its input terminals, the WRFF unit will reverse its state and will alternately gate the AND gates 2349 and 2351. Since the slow clock 2333 causes the Y stepping switch driver to step to a different core with each down portion of the slow clock output, the state of WRFF 2347 is reversed with each successive core under test, and with each successive core alternate ones of AND gates 2349 and 2351 are enabled, and therefore with successive cores FFG 2343 is reset through OR gate 2353 by alternate ones of AND gates 2349 and 2351 during the sixth and fifth clock periods respectively.

As explained in connection with the previous two modes of operation, when FFG 2343 is reset by the output of AND gate 2349, the core under test is left in the "0" state whereas if the FFG unit 2343 is reset by the output of AND gate 2351, the core under test is left in the "1" state. Consequently, since with successive cores FFG 2343 is reset alternately by the output of AND gates 2349 and 2351, successive cores are left in opposite states in the third mode of tester operation, as shown in FIG. 26 under the heading: "Memory Pattern Alternate Zeroes and Ones."

L. CONCLUSION

There has been described in the foregoing specification an apparatus for testing a very large number of cores in a memory matrix, rapidly and completely. The apparatus described is a preferred embodiment of the invention, being designed to test cores in a sophisticated type of coincident current matrix wherein only one X drive line, one Y drive line, and one inhibit line are used and currents are set through drive lines in one direction for reading and in an opposite direction for writing into a core. It will be obvious to those skilled in the computer art that my invention is equally adapted for testing cores in the earlier type of coincident current core matrix wherein there are two X drive lines, two Y drive lines and one inhibit drive through each core. This earlier type of matrix receives current in one pair of X and Y drive lines for reading from and in the other pair of X and Y drive lines for writing into a particular core. Additionally, this earlier type of matrix may not use the current steering scheme employed in the matrix illustrated in the foregoing specification and, instead of using two bi-polar current drivers coupled to each drive line, many use only one uni-polar driver coupled to one end of a drive line. If it is desired to use the apparatus incorporating my invention for testing such an earlier type of core matrix, a few simple modifications will easily adapt the apparatus for this purpose. Thus, instead of the eight memory drivers provided in the above embodiment the number might be reduced and would include one driver each for reading from X lines, reading from Y lines, writing into X lines, and writing into Y lines.

A rotary switch could be provided for each such driver with the wiper of each switch being connected to a driver and with the contacts of the switches being connected to the different drive lines of the matrix under test.

Thus the switch connected to the driver for sending

READ current through X drive lines would have its contacts connected individually to the different X READ lines of the matrix and similarly the switch connected to the X WRITE driver would have its contacts connected individually to the different X WRITE drive lines. In this manner the programmed outputs of the different drivers could be applied sequentially to drive lines linking successive cores in the matrix.

Further, the preferred embodiment was shown employing an electro-mechanical stepping switch for applying driving currents to successive cores in the matrix under test. It will be recognized by those skilled in the electronics arts that this switching function could well be performed and with greater speed by an electronic switching means. For example, instead of providing a limited number of memory drivers and connecting them to different drive lines through a stepping switch, a larger number of memory drivers might be connected to the drive lines permanently and these memory drivers might then be enabled sequentially in a proper sequence for applying the programmed outputs to drive lines linking successive cores in the matrix.

While a particular embodiment of the present invention has been shown and described in detail, it will be obvious to those skilled in the art that changes and modifications may be made without departing from the invention in its broader aspects. A few of these modifications have been outlined but many other modifications in structure, arrangement, and components may be used in the practice of the invention without departing from its basic principles.

What is claimed is:

1. Apparatus for testing a bistable magnetic core linked by a plurality of drive lines and by at least one sense line comprising in combination;

first means for generating a train of equally spaced clock pulses;

second means coupled to said first means and operable in response to the clock pulse train therefrom to produce a plurality of drive current pulse trains and at least one bi-level voltage check pattern;

third means for applying said drive current pulse trains to said drive lines, current pulses being distributed in said pulse trains to subject said core through said drive lines to combined magnetomotive forces of various magnitudes, at least one of which is sufficient to reverse the state of said core;

fourth means for generating a bi-level voltage pattern coupled to said sense line and operable to change levels in one direction in response to said core state reversal;

comparing means coupled to said second and fourth means said comparing means being operative to produce an output in response to a disparity between said check pattern output of said second means and said voltage pattern output of said fourth means.

2. Apparatus for testing a plurality of bistable magnetic cores, comprising;

first means for applying successive series of magnetomotive forces to one of said cores, each said series including at least one magnetomotive force sufficient to switch said core into one of its stable states;

bistable means having a different output voltage level in each of its stable states, coupled to all of said cores and operative to assume one of its stable states in response to said switching of said core;

second means for periodically resetting said bistable means into its other stable state;

switching means for automatically causing said series of magnetomotive forces to be applied to a subsequent one of said cores;

third means for generating a serial pattern of voltage levels which simulates the output of said bistable means when acted upon by a normal core under test; and fourth means coupled to said third means, to said bistable means, and to said switching means for interrupting the operation of said switching means in response to a disparity between the outputs of said bistable means and said third means.

3. Apparatus for testing a plurality of bistable magnetic cores coupled by drive lines comprising;

first means for applying successive series of magnetomotive forces to one of said cores, each said series including at least one magnetomotive force sufficient to switch said core into one of its stable states, said first means including a clock, a multistage binary counter driven by said clock, a plurality of interconnected logic circuits coupled to outputs of said binary counter, a multi-output timing circuit for generating gating pulses during each clock period, and a mixer circuit coupled to outputs of said logic circuits and to said timing circuit for applying timed current pulses to said drive lines;

a bistable flip flop having a different output voltage level in each of its stable states, coupled to all said cores and operative to assume one of its stable states in response to said switching of said core;

second means coupled to said timing circuit and to said bistable flip flop for periodically resetting said bistable flip flop into its other stable state;

switching means coupled to said first means and to said drive lines for automatically causing said series of magnetomotive forces to be applied to a subsequent one of said cores;

third means coupled to said binary counter of said first means, said third means including a plurality of logic circuits for producing a series of voltage levels which simulate the output of said bistable flip flop when acted upon by a normal core under test; and fourth means coupled to said third means, to said bistable flip flop, and to said switching means for interrupting the operation of said switching means in response to a disparity between the outputs of said bistable flip flop and said third means, said fourth means including a comparator having a plurality of logic circuits and an alarm circuit having therein a bistable flip flop.

4. Apparatus for testing a plurality of magnetic cores coupled by drive lines, each core having a stable READ and a stable WRITE state, comprising;

first means coupled to said drive line for applying successive series of magnetomotive forces to one of said cores through said drive lines, each said series including at least one force sufficient to switch said core into its READ state, and at least one other force sufficient to switch said core into its WRITE state;

bistable means having a different output voltage level in each of its stable states, coupled to said core and operative to assume one of its stable states in response to said switching of said core into one of its stable states;

second means for periodically resetting said bistable means into its other stable state;

third means coupled to said first means for periodically causing said series of magnetomotive forces to be applied to a subsequent one of said cores;

control means synchronized with said third means and coupled to said first means for terminating the last series of magnetomotive forces applied to alternate cores in a force which switches said alternate cores into opposite states respectively;

fourth means for generating a bi-level voltage series having a predetermined pattern; and fifth means coupled to said fourth means, to said bistable means and to said third means for stopping said third means in response to a disparity between the outputs of said bistable means and said fourth means.

5. The apparatus of claim 4 wherein said first means includes a clock, a multi-stage binary counter driven by said clock, a plurality of interconnected logic circuits coupled to outputs of said binary counter, a multi-output timing circuit for generating gating pulses during each clock period, and a mixer circuit coupled to outputs of said logic circuits and to said timing circuit for applying timed current pulses to said drive lines.

6. The apparatus of claim 5 wherein said bistable means is a flip flop, and wherein said second means is coupled to and controlled by said timing circuit of said first means.

7. The apparatus of claim 6 wherein said third means includes a stepping switch having outputs coupled to said drive lines and inputs coupled to said mixer circuit of said first means.

8. The apparatus of claim 7 wherein said control means include two coincidence gates coupled to said logic circuits of said first means, a complementing bistable flip flop having two output terminals individually coupled to inputs of said coincidence gates for enabling one of said gates in each of its stable states, a second bistable flip flop having an output connected to said binary counter for selectively disabling it, said flop flop also having first and second input means for setting it in first and second stable states respectively, mixer means for coupling said first input means to outputs of said coincidence means, and means coupled to said second input means for energizing said second input means in synchronism with the stepping of said switch.

9. The apparatus of claim 8 wherein said fifth means includes a comparator having a plurality of logic gates and also includes an alarm circuit comprising a bistable flip flop coupled to the output of said comparator.

10. A system for generating selectable patterns of bi-polar pulses comprising;

first means for generating bi-polar pulse trains, said first means including first and second tap means energized in synchronism respectively with predetermined ones of each polarity of said bi-polar pulse trains, said first means also including a conditionally enabled gating means operative when not enabled to terminate a said pulse train on a said predetermined pulse;

bistable means coupled to said gating means and operative in one of its stable states to enable said gating means;

second means for generating a bi-level voltage train;

third means for setting said bistable means in said one state in synchronism with one level of said bi-level voltage train; and detecting means coupled to said bistable means and to said first and second tap means, said detecting means being operative a predetermined time after each said one level of said bi-level voltage train to set said bistable means into its other stable state in response to energization of a selected one of said tap means.

11. In a tester for a plurality of bistable magnetic cores coupled by drive lines having driving means for supplying repeated trains of current pulses for application to drive lines coupling selected cores, said driving means including conditionally enabled gating means operative when not enabled to interrupt the operation of said driving means, said pulses producing in said selected cores repeated trains of magnetomotive force pulses, each train including a pair of READ and WRITE pulses, said tester also having a periodically stepped switching means for sequentially applying said current pulses to drive lines linking successive cores, and first and second tap means energized in synchronism with said READ and WRITE pulses respectively, a control system for causing said cores to be left in predetermined states of magnetization after testing, comprising;

bistable means coupled to said gating means and operative in one and only one of its stable states to enable said gating means;

means for setting said bistable means in said one state in synchronism with the stepping of said switching means; and detecting means coupled to said bistable means and to said tap means, said detecting means being operative a predetermined time after each stepping of said switching means to set said bistable means into its other stable state in response to energization of a selected one of said tap means.

12. In a tester for a plurality of bistable magnetic cores, having driving means for supplying repeated trains of magnetomotive force pulses to selected cores, each train including a pair of READ and WRITE pulses, said driving means including conditionally enabled gating means operative when not enabled to terminate a said pulse train on a WRITE pulse or a READ pulse, said tester also having a periodically stepped switching means for causing said pulse trains to be applied sequentially to successive cores, a control system for causing said cores to be left in predetermined states of magnetization after testing, comprising;

bistable means coupled to said gating means and operative in one and only one of its stable states to enable said gating means;

means for setting said bistable means in said one state in synchronism with each stepping of said switching means; and detecting means coupled to said bistable means and to said driving means, said detecting means being operative a predetermined time after each stepping of said switching means to set said bistable means into its other stable state in synchronism with a selected one of said READ and WRITE pulses.

13. The control system of claim 12, wherein said selected one of said READ and WRITE pulses is alternately a READ and WRITE pulse with successive positions of said switch.

14. In a tester for a plurality of bistable magnetic cores, having driving means for supplying repeated trains of magnetomotive force pulses to selected cores, each train including a pair of READ and WRITE pulses, said driving means including conditionally enabled gating means operative when not enabled to terminate a said pulse train on a WRITE pulse or a READ pulse, said driving means additionally including first and second tap means energized in synchronism with said READ pulse and said WRITE pulse respectively, said tester also having periodically stepped switching means for causing said pulse trains to be applied sequentially to successive cores, a control system for causing said cores to be left in predetermined states of magnetization after testing, comprising;

bistable means coupled to said gating means and operative in one and only one of its stable states to enable said gating means;

means for setting said bistable means in said one state in synchronism with each stepping of said switching means; and detecting means coupled to said bistable means and to said first and second tap means, said detecting means being operative a predetermined time after each stepping of said switching means to set said bistable means into its other stable state in response to energization of a selected one of said first and second tap means.

15. The control system of claim 14 wherein said selected one of said first and second tap means is alternately said first tap means and said second tap means with successive positions of said switching means.

16. The control system of claim 15, wherein said detecting means includes first and second multi-input coincidence means, each having an input coupled to one of said tap means;

means for mixing the outputs of said coincidence means;

means for alternately energizing a second input of said first and second coincidence means with successive steps of said switching means; and means for energizing a third input of said first and second coincidence means a predetermined time after each stepping of said switching means.

17. The control system of claim 16, wherein said means for alternately energizing includes a complementing flip flop.

References Cited

UNITED STATES PATENTS

| | | | |
|---|---|---|---|
| 2,679,025 | 5/1954 | Rajchman et al. | 340—174 XR |
| 2,934,696 | 4/1960 | Williams et al. | 340—174 XR |

| | | | |
|---|---|---|---|
| 3,238,449 | 3/1966 | Gordon et al. | 324—34 XR |
| 3,249,926 | 5/1966 | Ashley | 340—174 |

OTHER REFERENCES

Healey, J. F., et al.: Core Tester, IBM Technical Disclosure Bulletin, vol. 1 (2), pp. 38–39, August 1958.

BERNARD KONICK, Primary Examiner

G. M. HOFFMAN, Assistant Examiner

U.S. Cl. X.R.

307—106; 324—34; 340—146.2

PO-1050
(5/69)

UNITED STATES PATENT OFFICE
CERTIFICATE OF CORRECTION

Patent No. 3,474,421 Dated October 21, 1969

Inventor(s) Morris O. Stein

It is certified that error appears in the above-identified patent and that said Letters Patent are hereby corrected as shown below:

Column 1, line 24, "couping" should be --coupling--; column 2, line 12, "livel" should be --level--; column 3, line 19, "comprator" should be --comparator--; column 7, line 47, "as table" should be --astable--; column 8, line 21, "output" should be --outputs--; column 11, line 43, "on" should be --one--; column 14, line 16, "$\bar{C}D\ \bar{E}$" should be --$C\bar{D}\ \bar{E}$--; column 14, line 19, "input" should be --inputs--; column 15, line 17, "iput" should be --input--; column 15, line 23, "output" should be --outputs--; column 15, line 33, "DE" should be --$\bar{D}$ E--; column 18, line 72, before "cathodes" insert --joined--; column 22, line 63, "an dthe" should be --and the--; column 24, line 61, "gated signal" should be --gated W signal--; column 25, line 44, "2113, drive" should be --2113, X drive--; column 28, line 9, "and 2724 each" should be --and 2725 each--.

SIGNED AND
SEALED
JUN 9 1970

(SEAL)
Attest:

Edward M. Fletcher, Jr.
Attesting Officer

WILLIAM E. SCHUYLER, JR.
Commissioner of Patents